United States Patent [19]
Kikuchi

[11] Patent Number: 6,044,233
[45] Date of Patent: Mar. 28, 2000

[54] APPARATUS HAVING FILM CARTRIDGE HOLDING DEVICE

[75] Inventor: Hiroshi Kikuchi, Zushi, Japan

[73] Assignee: Canon Kabushiki Kaisha, Tokyo, Japan

[21] Appl. No.: 08/697,979

[22] Filed: Sep. 3, 1996

[30] Foreign Application Priority Data

| Sep. 8, 1995 | [JP] | Japan | 7-231098 |
| Sep. 8, 1995 | [JP] | Japan | 7-231098 |
| Sep. 11, 1995 | [JP] | Japan | 7-232344 |

[51] Int. Cl.$^7$ .................................................. G03B 19/06
[52] U.S. Cl. .......................................... 396/538; 396/511
[58] Field of Search ............................... 396/2, 446, 538, 396/511, 512, 374

[56] References Cited

U.S. PATENT DOCUMENTS

| 3,286,613 | 11/1966 | Domnick | 396/446 |
| 3,805,277 | 4/1974 | Domnick | 396/446 |
| 4,042,300 | 8/1977 | Spence-Bate | 396/446 |
| 5,016,030 | 5/1991 | Dwyer et al. | 396/319 |
| 5,142,316 | 8/1992 | Tanii et al. | 396/538 |
| 5,357,301 | 10/1994 | Prosser | 396/446 |
| 5,561,462 | 10/1996 | Nagano | 348/372 |
| 5,572,268 | 11/1996 | Tammamura | 396/319 |

*Primary Examiner*—Safet Metjahic
*Assistant Examiner*—Michael Dalakis
*Attorney, Agent, or Firm*—Robin, Blecker & Daley

[57] ABSTRACT

A film cartridge holding device includes a holding member having a holding portion arranged to hold a film cartridge in such a way as to enable the film cartridge to be loaded in an axial direction of the film cartridge, and a moving mechanism arranged to move the holding member between a first position in which the holding portion of the holding member protrudes from the film cartridge holding device in such a way as to enable the film cartridge to be loaded into the holding portion in the axial direction and a second position in which the holding portion of the holding member is stowed in the film cartridge holding device in such a way as to enable a film contained in the film cartridge loaded in the holding portion to be transported.

31 Claims, 31 Drawing Sheets

(LIGHT-SHIELDING DOOR IN CLOSED STATE)

(LIGHT-SHIELDING DOOR IN OPEN STATE)

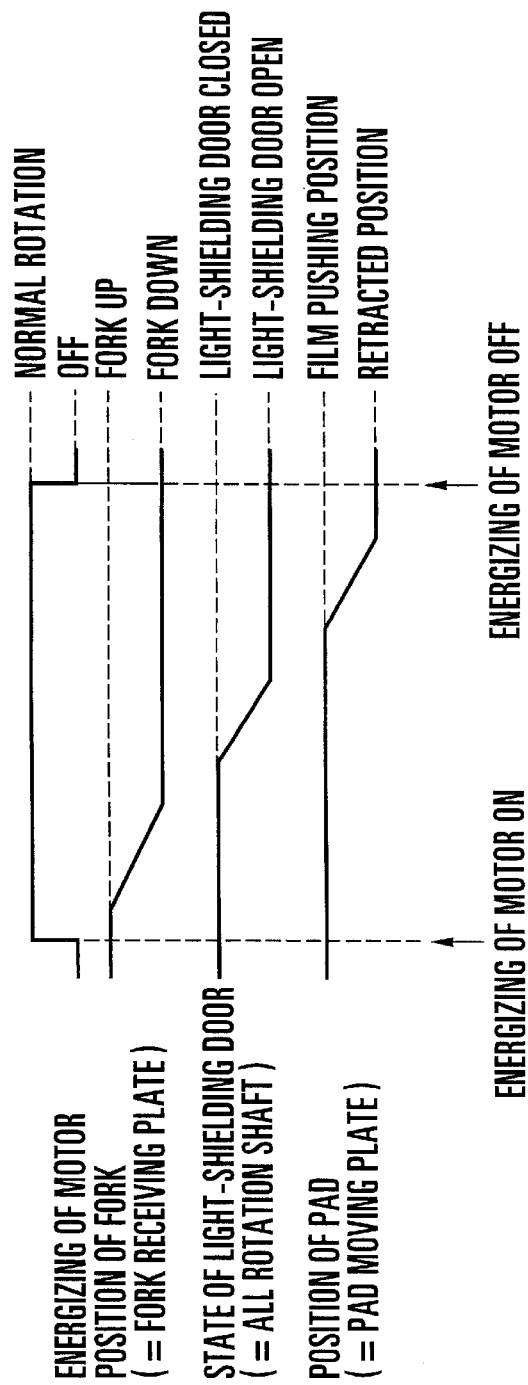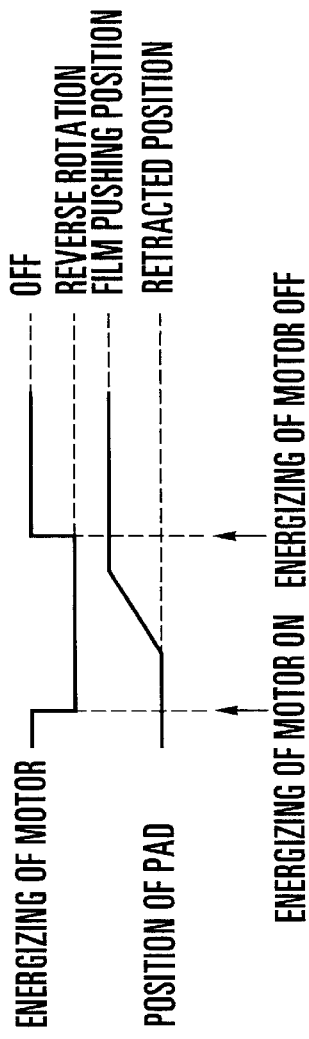

APPARATUS HAVING FILM CARTRIDGE HOLDING DEVICE

BACKGROUND OF THE INVENTION

1. Field of the Invention

This invention relates to a film cartridge holding device and an apparatus having the film cartridge holding device.

2. Description of the Related Art

A film image reproducing apparatus arranged to pickup an image recorded on a developed film, to convert the picked-up image into a video signal and to reproduce the image on a TV monitor by guiding the video signal to the TV monitor is disclosed in Japanese Laid-Open Patent Application No. HEI 4-501490. Meanwhile, in U.S. Pat. No. 4,841,319, there is disclosed a film cartridge of a novel kind. This film cartridge is arranged to discharge a film from a film discharge port according to the rotation of a film supply spool disposed within the film cartridge. Hereinafter, the film cartridge of this kind is referred to as a thrust type film cartridge.

A film image reproducing apparatus adapted for use of the thrust type film cartridge is disclosed in Japanese Laid-Open Patent Application No. HEI 6-181536. In this film image reproducing apparatus, with a developed film contained in the thrust type film cartridge which is loaded, an image on the developed film is converted into a video signal and, then, reproduced by guiding the video signal to a display means such as a TV monitor.

However, the film image reproducing apparatus adapted for use of the thrust type film cartridge has presented the following problems.

(i) In order to drive the film supply spool disposed within the thrust type film cartridge, it is necessary to cause some engaging means such as a fork or the like to mesh with a spline of a hole part formed at an end part of the film supply spool.

The film image reproducing apparatus is, on the other hand, preferably designed to have the thrust type film cartridge loaded in the axial direction thereof, thereby resulting in a reduction in size and cost of the film image reproducing apparatus. However, such a loading method for the film cartridge greatly restricts the possible place of installation and the design shape of the film image reproducing apparatus.

FIGS. 10 and 11 show by way of example how the film image reproducing apparatus is installed. In this case, the film image reproducing apparatus is installed in combination with a monitor for viewing the output of the apparatus. FIG. 10 is an oblique view illustrating a TV monitor 100, a stand 101 for the TV monitor 100, and the film image reproducing apparatus 102. FIG. 11 is a partially sectional side view of FIG. 10, with the TV monitor stand 101 shown in a sectional shape.

In installing such an apparatus, it is generally desirous, for stability, that the apparatus is arranged to have a larger dimension in the horizontal direction than in the direction of height. In other words, dimensions A and B shown in FIG. 11 are preferably in a relation of A>B.

In the case of the film image reproducing apparatus, it is necessary to read the image on the film by using an image pickup means such as a CCD or the like through an optical system. It is desirable, for reduction in size of the whole apparatus, to arrange the optical system to have its optical axis along the horizontal direction. With the apparatus arranged in such a manner, however, the film must be disposed in the vertical direction, which is perpendicular to the optical axis. Then, if the film cartridge is to be loaded in the axial direction thereof, the film cartridge also must be loaded in the vertical direction, i.e., in the direction of arrow "b". However, as apparent from FIG. 11, the arrangement for loading the film cartridge in the direction of arrow "b" is hardly possible or extremely difficult as the TV monitor stand 101 hinders the film cartridge loading direction.

The film image reproducing apparatus, therefore, must be arranged either to be installed outside of the TV monitor stand 101 or to load the film cartridge from the front side of the apparatus, i.e., in the direction of arrow "a", by arranging the optical axis of the optical system along the vertical direction and increasing the dimension B at the expense of compactness and stability of the apparatus.

(ii) In a case where images on films contained in a plurality of film cartridges are to be continuously reproduced, the film cartridges must be brought in turn to a film transport operable position and a non-operable position by replacing them one after another. In that case, the apparatus necessitates a complex arrangement for such a replacing operation.

Meanwhile, there is proposed another film image reproducing apparatus which is intended to allow a greater amount of latitude both in installing place and design shape. Referring to FIG. 28, the apparatus is provided with a cartridge holder 801 which has cartridge chambers 801a arranged to permit loading four film cartridges at a time. After the film cartridges K are put in the cartridge chambers 801a, a holder tray 802 on which the cartridge holder 801 is set moves in the horizontal direction, which is orthogonal to the axes of the film cartridges K, to stow the cassette holder 801 within the film image reproducing apparatus 800.

The film image reproducing apparatus shown in FIG. 28 necessitates some arrangement to drive a spool disposed within each film cartridge to rotate by causing an engaging means such as a fork or the like to be meshed with a key way of the spool. Further, a light-shielding door for a film egress/ingress slot in the film cartridge has a hole, which is provided with a key way which extends also in the direction of the axis of the spool. In opening and closing the light-shielding door, an engaging shaft must be caused to be in mesh with this key way and to be driven to rotate.

In loading the film cartridge into the apparatus, the cartridge is inserted into the cartridge chamber 801a in the axial direction of the film cartridge. Then, according to a generally practiced method, the fork which protrudes from the bottom of the cartridge chamber and the engaging shaft (hereinafter referred to as ALL opening-and-closing shaft) which is provided for opening and closing the light-shielding door of the film cartridge are caused to mesh respectively with the key way hole of the spool and the key way hole of the light-shielding door which are formed on the side of the film cartridge. Such a loading method for the film cartridge has become popular, particularly in the field of cameras.

However, the film cartridge loading method has the following drawbacks. Referring to FIG. 29, the fork 803 and the ALL opening-and-closing shaft 804 might not be sufficiently inserted into the holes of the film cartridge K with the film cartridge K merely dropped into the cartridge chamber by the operator of the apparatus from above in the axial direction of the film cartridge. If the holder tray 802 is moved in the direction of a shown arrow toward the body of the apparatus with the film cartridge K in the insufficiently inserted state, the film cartridge K hits an edge part 800a of an opening provided in a holder stowing part of the apparatus, as indicated by a hitting amount Q. Then, the insufficient insertion not only prevents the film cartridge K from being stowed inside of the apparatus but also damages the film cartridge K or the apparatus.

To avoid the insufficiently inserted state of the fork and the ALL opening-and-closing shaft, the operator might strongly push the film cartridge downward from above. Then, in anticipation of such a hard pushing operation, if the holder tray is arranged to have a greater bending strength and a strong holding structure, the size and cost of the whole apparatus would increase.

Summary of the Invention

In accordance with one aspect of this invention, there is provided a film cartridge holding device comprising a holding member having a holding portion arranged to hold a film cartridge in such a way as to enable the film cartridge to be loaded in an axial direction of the film cartridge, and a moving mechanism arranged to move the holding member between a first position in which the film cartridge is enabled to be loaded into the holding portion in the axial direction and a second position in which a film contained in the film cartridge loaded in the holding portion is enabled to be transported, so that a loading operation and a replacing operation for the film cartridge can be facilitated.

The above and other aspects and features of this invention will become apparent from the following detailed description of embodiments thereof taken in conjunction with the accompanying drawings:

BRIEF DESCRIPTION OF THE DRAWINGS:

FIG. 33 is a timing chart showing actions of various parts of the sixth embodiment in relation to the action of a motor.

FIG. 34 is a timing chart also showing actions of various parts of the sixth embodiment in relation to an action of the motor.

DETAILED DESCRIPTION OF THE PREFERRED EMBODIMENTS

Figure 1:
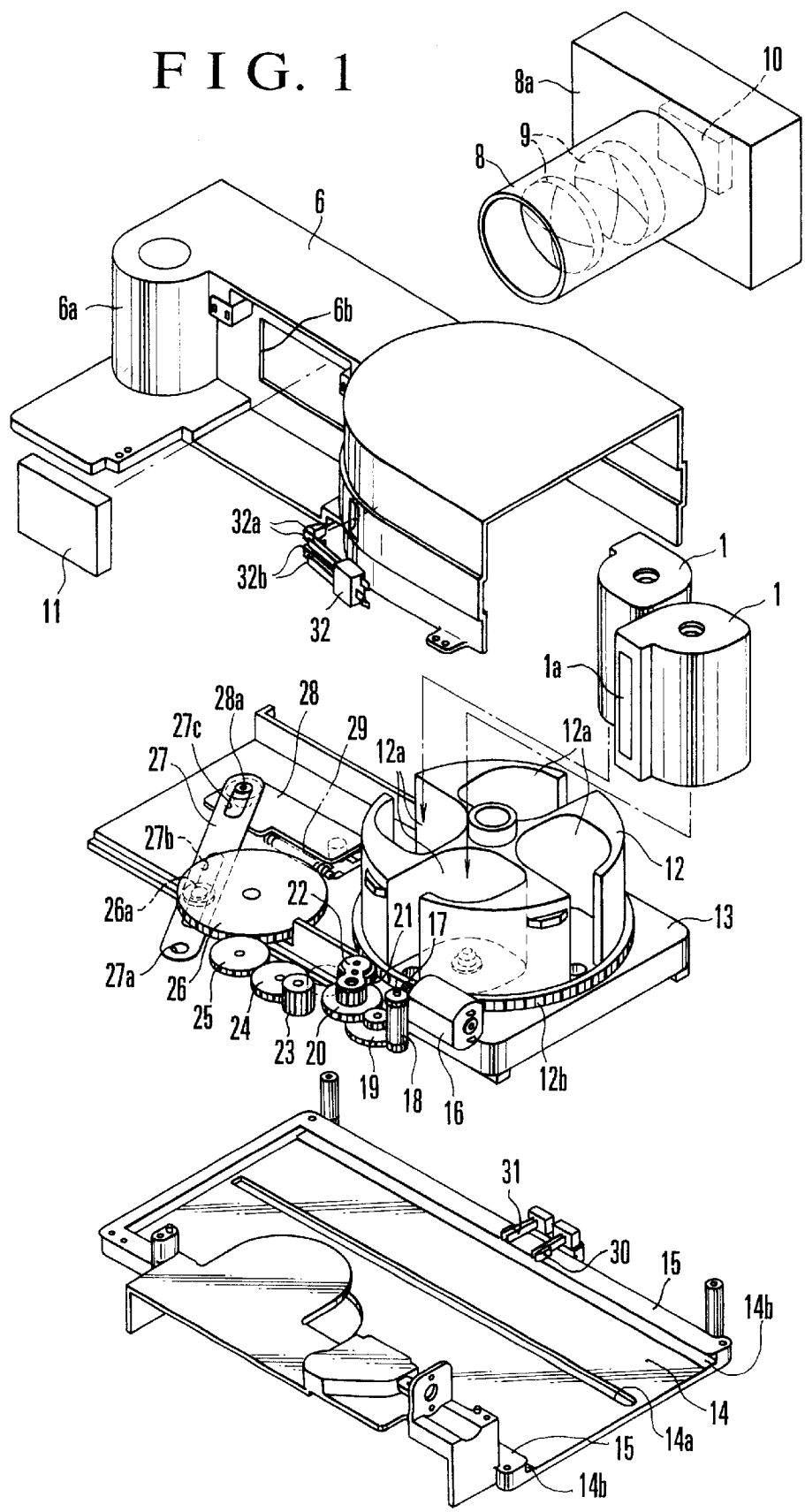
FIG. 1 is an exploded oblique view showing a film image reproducing apparatus to which this invention is applied as a first embodiment thereof.
Figure 2:
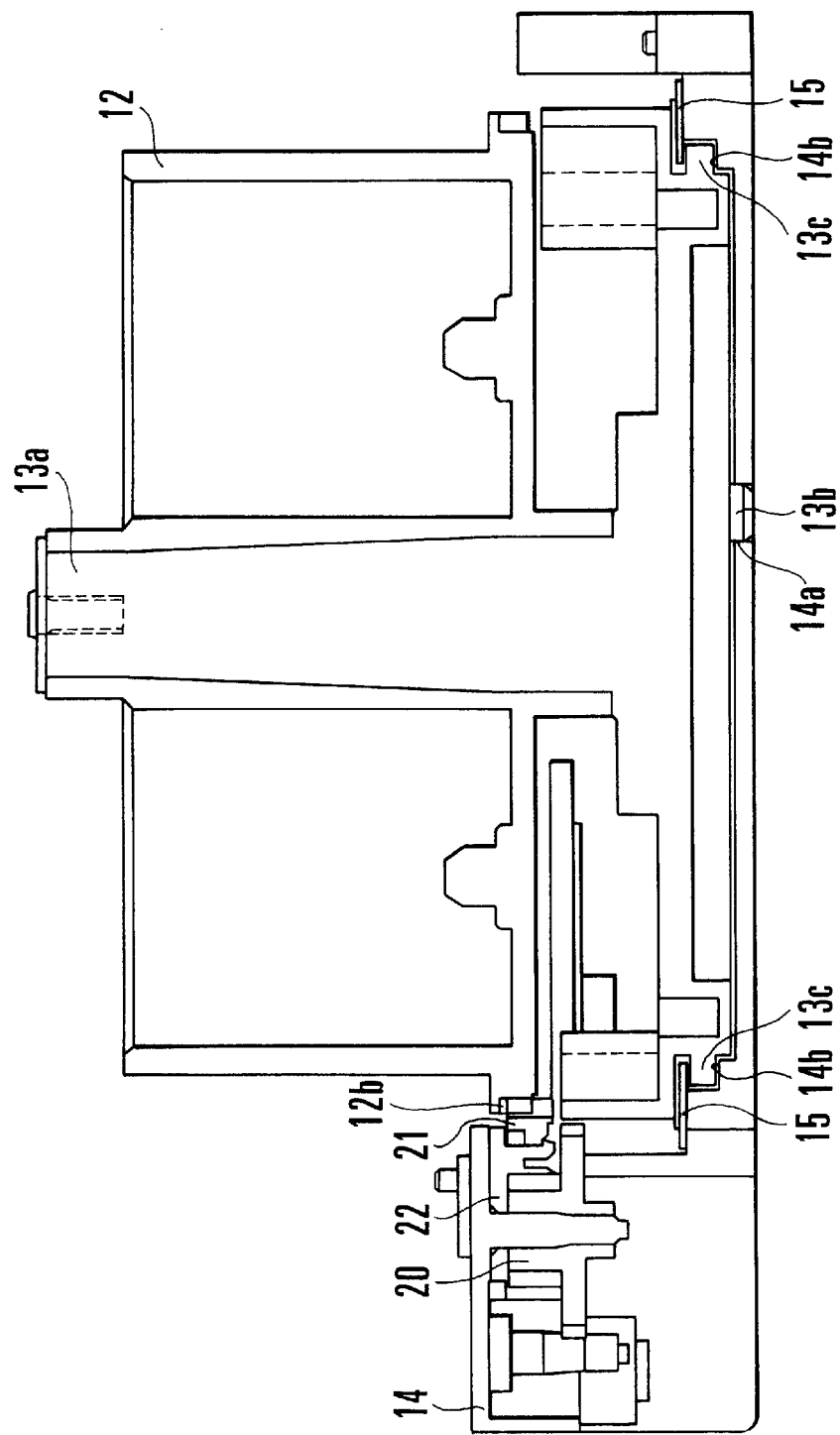
FIG. 2. is a vertical section view showing the first embodiment of this invention including a cartridge holder.
Figure 3:
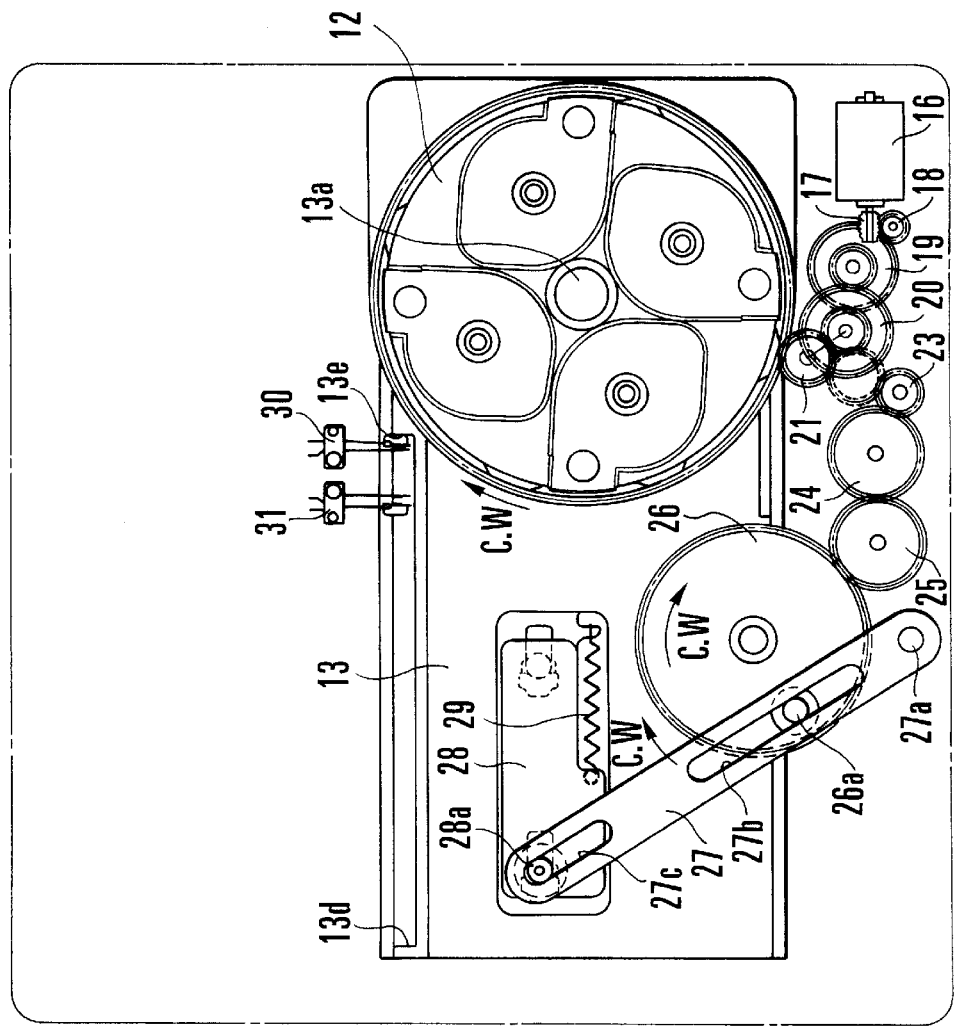
FIG. 3 is a plan view showing the first embodiment of this invention in a state of having the cartridge holder stowed within the apparatus.
Figure 4:
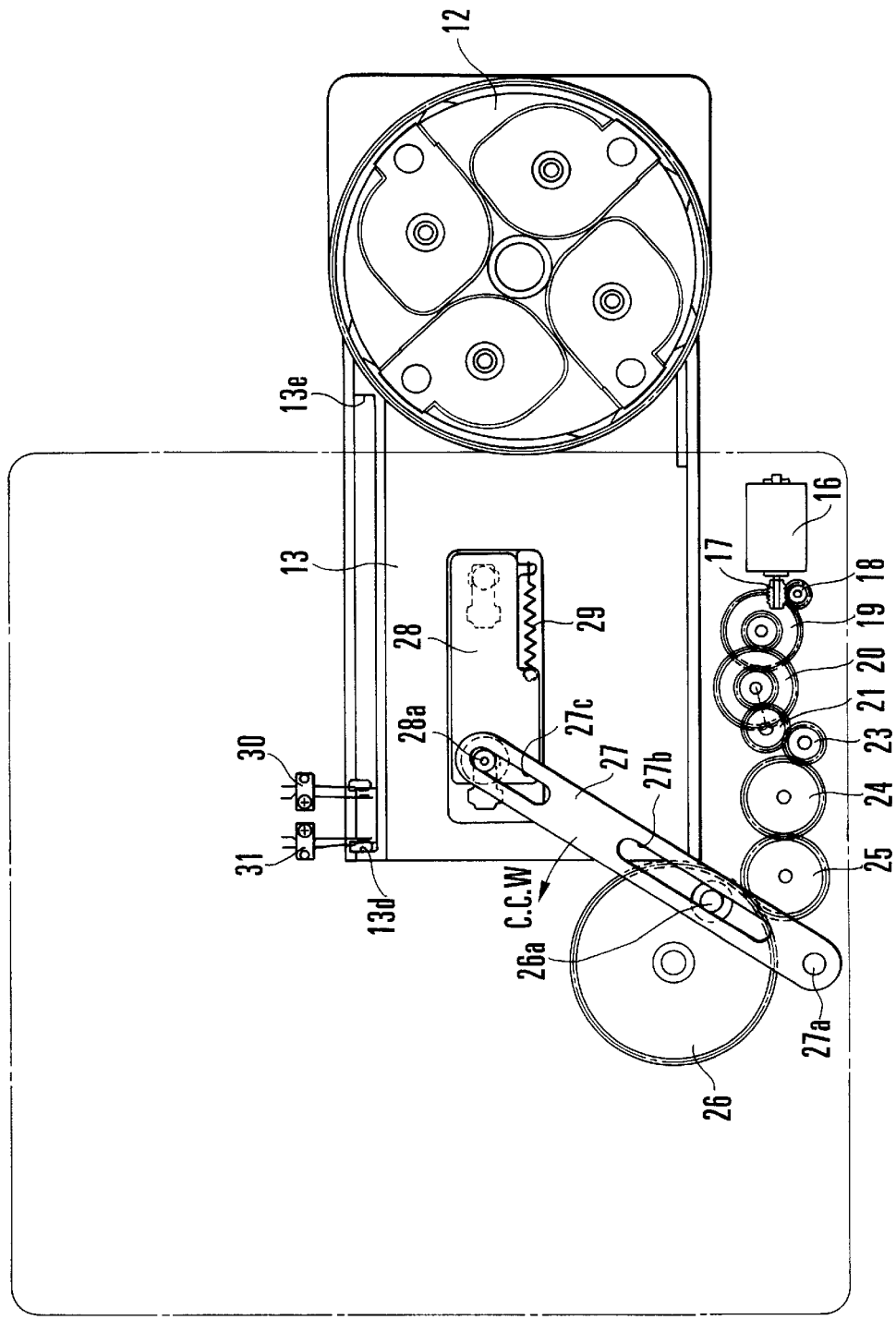
FIG. 4 is a plan view showing the first embodiment of this invention in a state of having the cartridge holder protruding from the apparatus.
Figure 5:
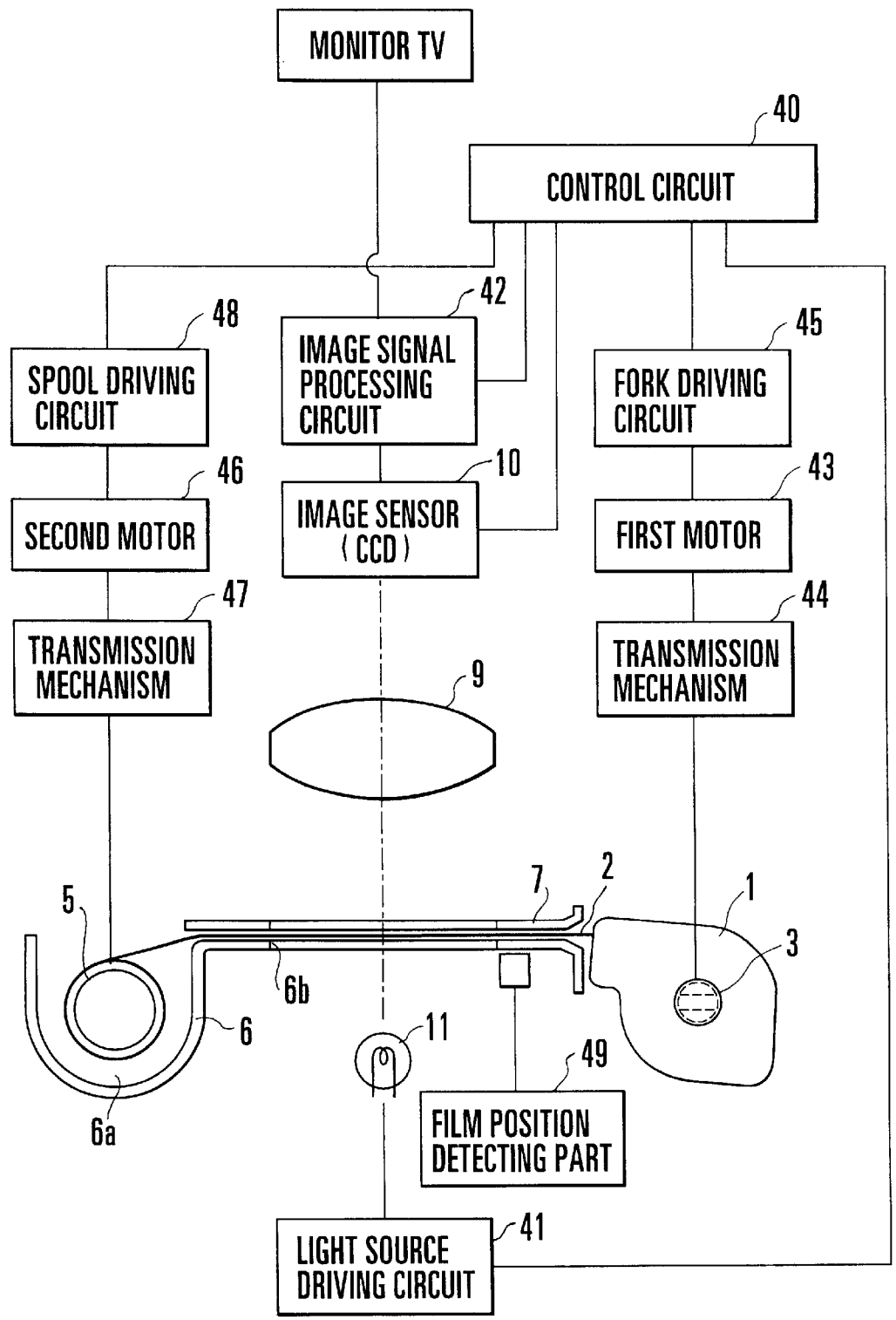
FIG. 5 is a block diagram showing the basic arrangement of the film image reproducing apparatus which is the first embodiment of this invention.

FIGS. 1 to 5 show a film image reproducing apparatus which is arranged according to this invention as a first embodiment thereof. Of these drawings, FIG. 1 best shows the features of the film image reproducing apparatus in an exploded oblique view. FIG. 2 is a vertical section view of the film image reproducing apparatus mainly showing the cartridge holder of the apparatus. FIG. 3 is a plan view showing the cartridge holder in a state of being stowed within the body of the apparatus. FIG. 4 is a plan view showing the cartridge holder in a state of protruding from the apparatus body. In FIGS. 3 and 4, the external shape of the apparatus body is shown expediently by a one-dot chain line. FIG. 5 is a block diagram showing the basic arrangement of the film image reproducing apparatus which is the first embodiment. In the case of the first embodiment, the film image reproducing apparatus is connected through a cable to a TV monitor and is arranged to cause an image on a developed film to be reproduced and to be displayed on a screen of the TV monitor.

Referring to these drawings, a thrust type film cartridge 1 contains therein a take-up shaft (not shown) which is rotatably supported. A developed film 2 is wound around the take-up shaft in a state of having its one end connected to the tape-up shaft and accommodated in the thrust type film cartridge 1. The thrust type film cartridge 1 is provided with a film egress/ingress slot 1a. The film 2 is payed out from or rewound into the film egress/ingress slot 1a. A fork 3 is arranged to engage the take-up shaft contained in the thrust type film cartridge 1.

A take-up spool 5 for winding the film 2 thereon is rotatably supported by a spool chamber 6a which is formed integrally with a body 6 of the apparatus, and is connected to a film transport gear train which is not shown. An aperture part 6b is formed in the body 6 for exposing an image plane (frame) of the developed film. A film pressing plate 7 is arranged to secure the flatness of the thin film 2 by preventing the film 2 from waving between the film sliding face of the body 6 and the film pressing plate 7 and also serves to restrict its position on the optical axis of a lens of the apparatus.

The film pressing plate 7 is also provided with an opening part which corresponds to one image plane of the film 2. A photo-taking lens barrel 8 is arranged to hold an optical system 9 and also to hold, at a flange part 8a, an image sensor 10 which is a CCD or the like. A light source 11 which is composed of a light emitting body such as a planar light emission type fluorescent lamp or a xenon lamp is arranged to project light onto the film 2 drawn out of the thrust type film cartridge 1. The light is thus projected from the light source 11 onto the image plane of the developed film 2. Transmitted light thus obtained through the developed film 2 passes the aperture part 6b of the body 6 and is guided to the image sensor 10 through the optical system 9 to form an image on the image sensor 10.

The film image reproducing apparatus according to the first embodiment of this invention is arranged to have the thrust type film cartridge loaded and replaced in the following manner.

A cartridge holder 12 is provided with cartridge chambers 12a which are arranged to be capable of stowing four thrust type film cartridges. A gear 12b is integrally formed on the periphery of the cartridge holder 12 and is connected to a gear train which will be described later. A holder tray 13 is integrally provided with a shaft 13a. The cartridge holder 12 is held by the holder tray 13 in such a way as to be rotatable on the shaft 13a.

A tray base plate 14 is of an approximately rectangular flat shape and is provided with a slot 14a which extends in the longitudinal direction of the tray base plate 14. A dowel 13b which is formed on the bottom of the holder tray 13 is slidably fitted in the slot 14a, so that the holder tray 13 is arranged to be movable along the slot 14a. A tray retaining plate 15 is arranged to push the leg parts 13c of the holder tray 13 in between a sliding face 14b of the tray base plate 14 and the tray retaining plate 15.

A motor 16 has a worm gear 17 press fitted on its output shaft. Gears 18 and 19 and a sun gear 20 form a gear train which is mounted on the tray base plate 14 to transmit the rotation of the motor 16. A planet gear 21 is held with friction by a planet arm 22 and is arranged to revolve around the axis of the sun gear 20 by meshing with a small gear part of the sun gear 20. Idle gears 23, 24 and 25 are mounted on the tray base plate 14 to form a gear train which leads to a tray driving gear 26.

The planet gear 21 meshes with the gear 12b of the cartridge holder 12 when the sun gear 20 rotates clockwise (CW), and meshes with the idle gear 23 to transmit the rotation to the tray driving gear 26 when the sun gear 20 rotates counterclockwise (CCW).

A tray driving lever 27 is pivotally supported by the tray base plate 14 in such a way as to be swingable on a hole 27a provided in its one end part. A pin 26a of the tray driving gear 26 is fitted in a slot 27b which is formed in the middle part of the tray driving lever 27. A pin 28a of a tray driving plate 28 is fitted in a slot 27c which is formed in the other end part of the tray driving lever 27.

The tray driving plate 28 is arranged to be movable to a very small extent relative to the holder tray 13. A tension spring 29 is hooked between the tray driving plate 28 and the holder tray 13. The direction in which the tray driving plate 28 is to be moved relative to the holder tray 13 is set to be the same as the moving (protruding or stowing) direction of the holder tray 13 relative to the tray base plate 14. A difference between the amount of movement of the tray driving plate 28 caused by the swing of the tray driving lever 27 and a predetermined amount of movement of the holder tray 13 determined by the body 6 at the time of stowing is absorbed by the elongation of the tension spring 29.

A tray stowing position detecting switch 30 is arranged to turn on when the holder tray 13 is stowed in the apparatus body 6, as shown in FIG. 3. More specifically, with the holder tray 13 moved from its protruding position toward the stowing position, the switch 30 detects arrival of the holder tray 13 at the stowing position. A tray protruding position detecting switch 31 is arranged to turn on when the holder tray 13 comes to protrude a predetermined amount from the apparatus body 6, as shown in FIG. 4. With the holder tray 13 moved from the stowing position within the apparatus body 6 toward the protruding position, the switch 31 detects the holder tray 13 protruding by the predetermined amount.

A holder switch 32 is composed of first and second contact pieces 32a and 32b which are arranged in two channels. The holder switch 32 detects the rotating position (indexing position) of the cartridge holder 12 when the first contact piece 32a is pushed to turn on by one of four projections 12c provided on the cylindrical side face of the cartridge holder 12, so that the cartridge holder 12 is stopped from rotating in a position where the film can be transported from the thrust type film cartridge 1.

One projection 12d which is also provided on the cylindrical side face of the cartridge holder 12 is disposed at a height different from that of the four projections 12c in the direction of the rotation axis of the cartridge holder 12. The rotating position of the cartridge holder 12 is detected when the second contact piece 32b of the holder switch 32 is pushed to turn on by the projection 12d. The holder switch 12 is thus arranged to detect a specific position of the cartridge holder 12 when the holder tray 13 comes to protrude from the apparatus body 6.

The actions of mechanisms to be performed in loading the thrust type film cartridge into the film image reproducing apparatus are next described as follows. The holder tray 13 is assumed to be in the stowing position within the apparatus body 6 when the apparatus is in an initial state, as shown in FIG. 3.

When an operation panel which is not shown is operated to energize the motor 16 to rotate in the normal rotating direction, the sun gear 20 rotate in the counterclockwise direction (hereinafter referred to as CCW direction), the planet gear 21 meshes with the idle gear 23 to cause the tray driving gear 26 to rotate in the clockwise direction (hereinafter referred to as CW direction). The planet gear 21 is then in a position as indicated by a broken line in FIG. 3. The tray driving lever 27 which has the pin 26a fitted in the slot 27b then swings also in the CW direction according to the rotation of the tray driving gear 26. The holder tray 13 is caused to move along the guide hole 14a of the tray base plate 14 through the tray driving plate 28 to protrude outside of the apparatus body 6. A wall part 13d of the holder tray 13 then pushes the tray protruding position detecting switch 31 to turn on. With the switch 31 turned on, electric power supplied to the motor 16 is cut off to apply brake. In the state thus obtained, the cartridge holder 12 which is placed on the holder tray 13 is exposed to the outside of the apparatus body 6. Therefore, the thrust type film cartridge 1 can be easily loaded in the direction of the axis thereof.

The operator of the apparatus thus can load the apparatus with a maximum of four thrust type film cartridges by dropping them into the cartridge holder 12. After loading of the thrust type film cartridges, the operation panel which is not shown is operated to energize the motor 16 in the direction of its normal rotation for stowing the holder tray 13.

With the motor 16 thus energized, the sun gear 20 rotates in the CCW direction in the same manner as in causing the holder tray 13 to protrude. The planet gear 21 is kept in mesh with the idle gear 23 to cause the tray driving gear 26 to rotate in the CW direction. The tray driving lever 27 which has the slot 27b swings in the CCW direction, this time, according to the motion of the pin 26a fitted in the slot 27b. The holder tray 13 is caused to move toward the apparatus body 6 along the guide hole 14a of the tray base plate 14 through the tray driving plate 28. A wall part 13e of the holder tray 13 then pushes the tray stowing position detecting switch 30 to turn on, thereby cutting off the supply of electric power to the motor for brake application. As a result, the cartridge holder 12 which is placed on the holder tray 13 is stowed inside of the apparatus body 6. In this state, the cartridge holder 12 can be rotated in a manner as described below.

An operation for changing the position of the thrust type film cartridge, i.e., the rotating action for the cartridge holder of the film image reproducing apparatus, in the first embodiment is next described as follows.

When the operation panel (not shown) is operated to energize the motor 16 in the direction of its reverse rotation, the sun gear 20 rotates in the CW direction. The planet gear 21 revolves to mesh with the gear 12b of the cartridge holder 12. The cartridge holder 12 is thus caused to rotate in the CW direction. The projection 12c of the cartridge holder 12 then causes the holder switch 32 to turn on by pushing the first contact piece 32a of the holder switch 32. With the cartridge holder 12 thus detected to have been rotated into an apposite position, the supply of electric power to the motor 16 is cut off to apply brake.

Figure 6:
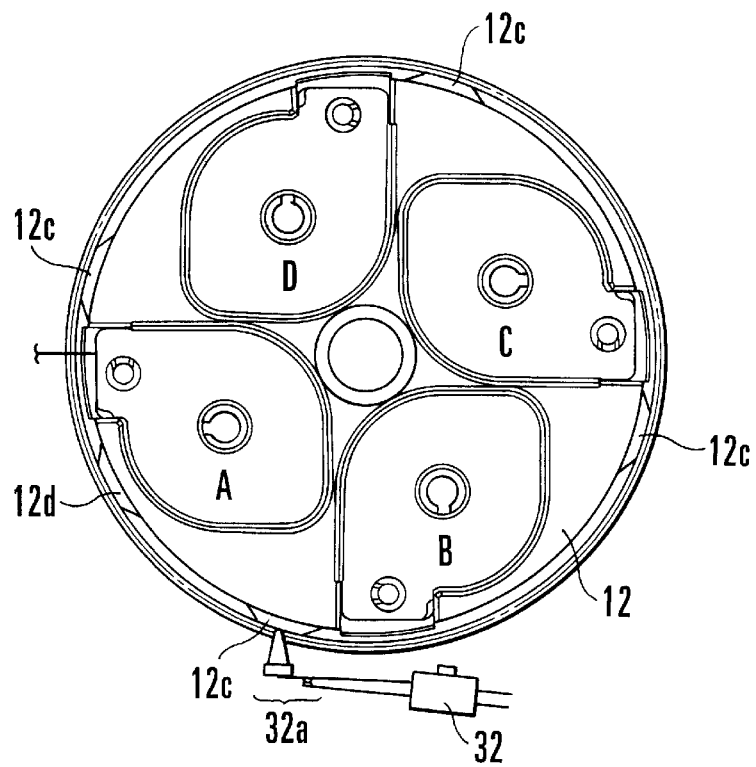
FIG. 6 shows the relation of the cartridge holder of the first embodiment to a holder switch.

FIG. 6 shows a relation obtained between the cartridge holder 12 and the first contact piece 32a of the holder switch 32 when the supply of electric power to the motor 16 is ended. In this state, a thrust type film cartridge A is in a film transport operable position to be ready for display of an image recorded on the film, while other thrust type film cartridges B, C and D are in a film transport non-operable position.

When the cartridge holder 12 is further rotated from the above-stated state, the thrust type film cartridge B next comes into the film transport operable position. The thrust type film cartridge to be used for an image display is thus changed from one over to another in turn.

Figure 7:
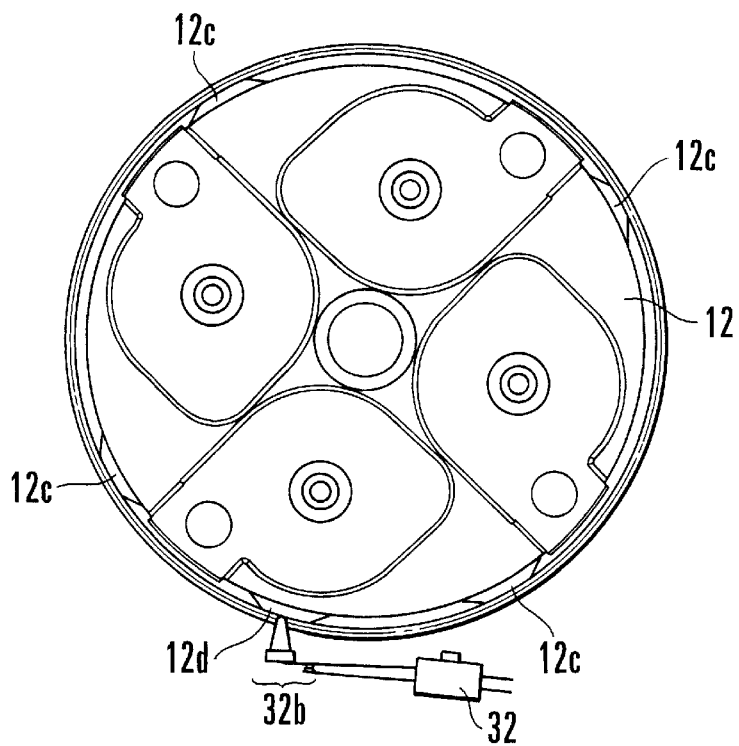
FIG. 7 shows also the relation of the cartridge holder of the first embodiment to the holder switch.

FIG. 7 shows a relation obtained between the cartridge holder 12 and the second contact piece 32b of the holder switch 32 either immediately before the holder tray 13 protrudes from the apparatus body 6 or immediately after the holder tray 13 is moved from its protruding position to a stowed position.

When an operation for protruding the holder tray 13 is performed, the cartridge holder 12 is first caused to rotate and comes to a stop in a position where the projection 12d which is disposed only at one part of the cartridge holder 12 pushes the second contact piece 32b to turn the holder switch 32 on. Following this, the protruding action is performed on the holder tray 13 by reversing the energizing direction of the motor 16. When the holder tray 13 is protruding from the apparatus body, therefore, the position of the cartridge holder 12 in the rotating direction thereof is thus always specified. This arrangement enables the operator to easily know from which of the thrust type film cartridges the film can be transported in displaying images by changing one thrust type film cartridge over to another with the apparatus loaded with four thrust type film cartridges.

Further, when an operation for stowing the holder tray 13 is performed, the holder tray 13 is first stowed inside of the apparatus body 6. Subsequently, the cartridge holder 12 is caused to rotate by reversing the direction in which the motor 16 is energized. The cartridge holder 12 is brought to a stop in a position where the projection 12c first comes to push the first contact piece 32a to turn the switch 32 on. In this position, the thrust type film cartridge is ready for film transportation.

After loading the film image reproducing apparatus with the film cartridges as mentioned above, the control system of the apparatus operates as follows.

Referring to FIG. 5 which is a block diagram showing the control system, a control circuit 40 includes a microcomputer arranged to preside over the sequence of actions of the whole apparatus. A light source driving circuit 41 is arranged to drive the light source 11. An image signal processing circuit 42 is arranged to process an image picked up from the surface of the film 2 into a video signal by means of the image sensor 10 such as a CCD. A transmission mechanism 44 which is composed of gears, etc., is arranged to transmit an output of a first motor 43 to the fork 3. A fork driving circuit 45 is arranged to drive the first motor 43. A transmission mechanism 47 composed of gears, etc., is arranged to transmit an output of a second motor 46 to the film take-up spool 5. A spool driving circuit 48 is arranged to drive the second motor 46.

With the control system arranged as described above, the spool driving circuit 48 is controlled in accordance with a control signal coming from the control circuit 40. The spool driving circuit 48 then drives the second motor 46 to cause the film take-up spool 5 to rotate through the transmission mechanism 47. With the film take-up spool 5 rotated, the film 2 is wound on the spool 5. Each frame portion of the film 2 is indexed as follows. A film position detecting part 49 composed of a combination of light projecting means and light receiving means, such as an SPC or the like, detects one of predetermined film frame positions represented by perforations. Then, the film winding process is brought to a stop according to the result of detection. When the image on the film 2 is set in a position to be opposed to the aperture part 6b of the apparatus body 6, the light source 11 is caused to light up by the light source driving circuit 41 according to a control signal coming from the control circuit 40. The light of the light source 11 illuminating the image on the film 2 is guided to the image sensor 10 through the optical system 9. An optical image thus obtained is picked up by the image sensor 10. The image signal processing circuit 42 receives the result of picking up the image and converts it into a video signal. The video signal is supplied through a cable to the TV monitor. The image is thus reproduced on the screen of the TV monitor.

When the film is to be rewound as desired by the operator, a control signal is outputted from the control circuit 40 in response to an operation on the operation panel which is not shown. The fork driving circuit 45 is controlled by the control signal to drive the first motor 43, thereby causing the fork 3 to rotate through the transmission mechanism 44. Accordingly, the film 2 is rewound into the film cartridge 1.

Figure 8:
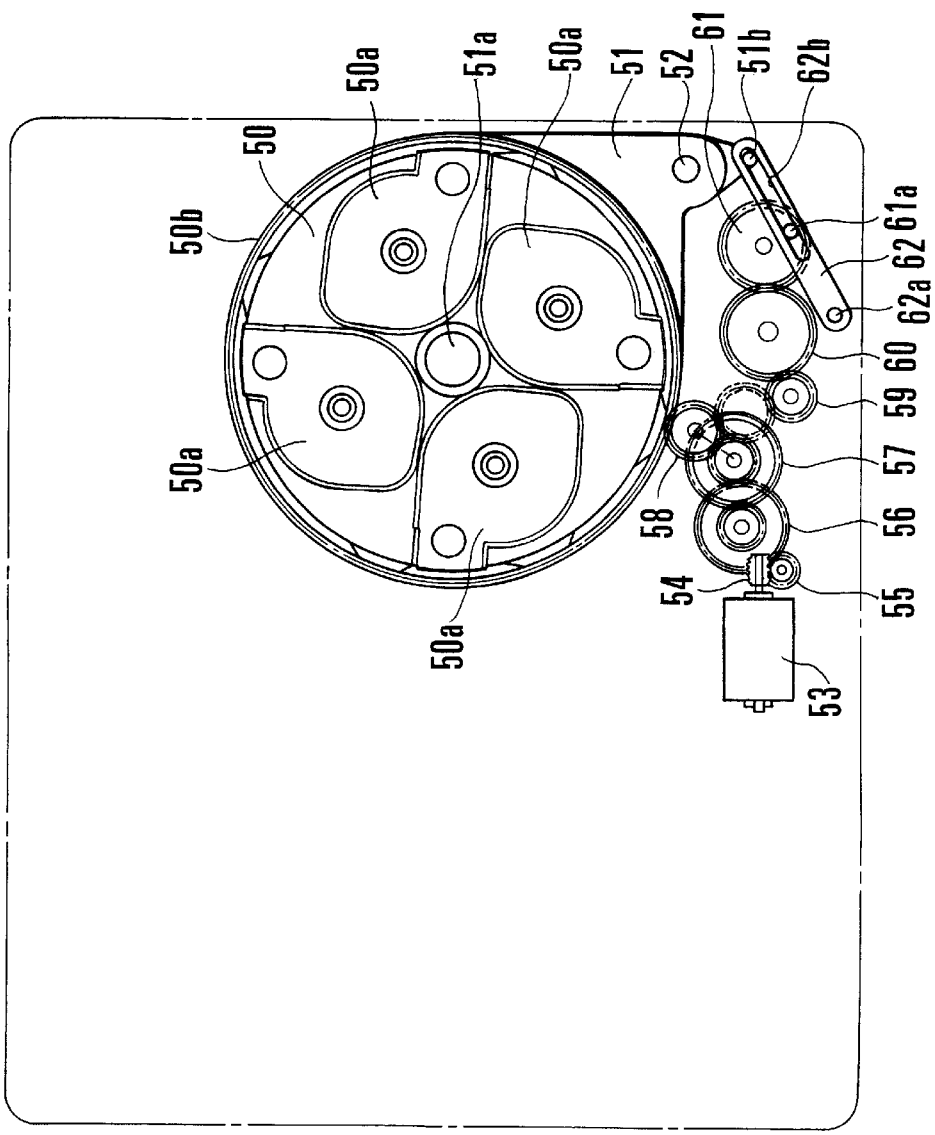
FIG. 8 is a plan view showing a film image reproducing apparatus arranged as a second embodiment of this invention in a state of having a cartridge holder stowed within the apparatus.
Figure 9:
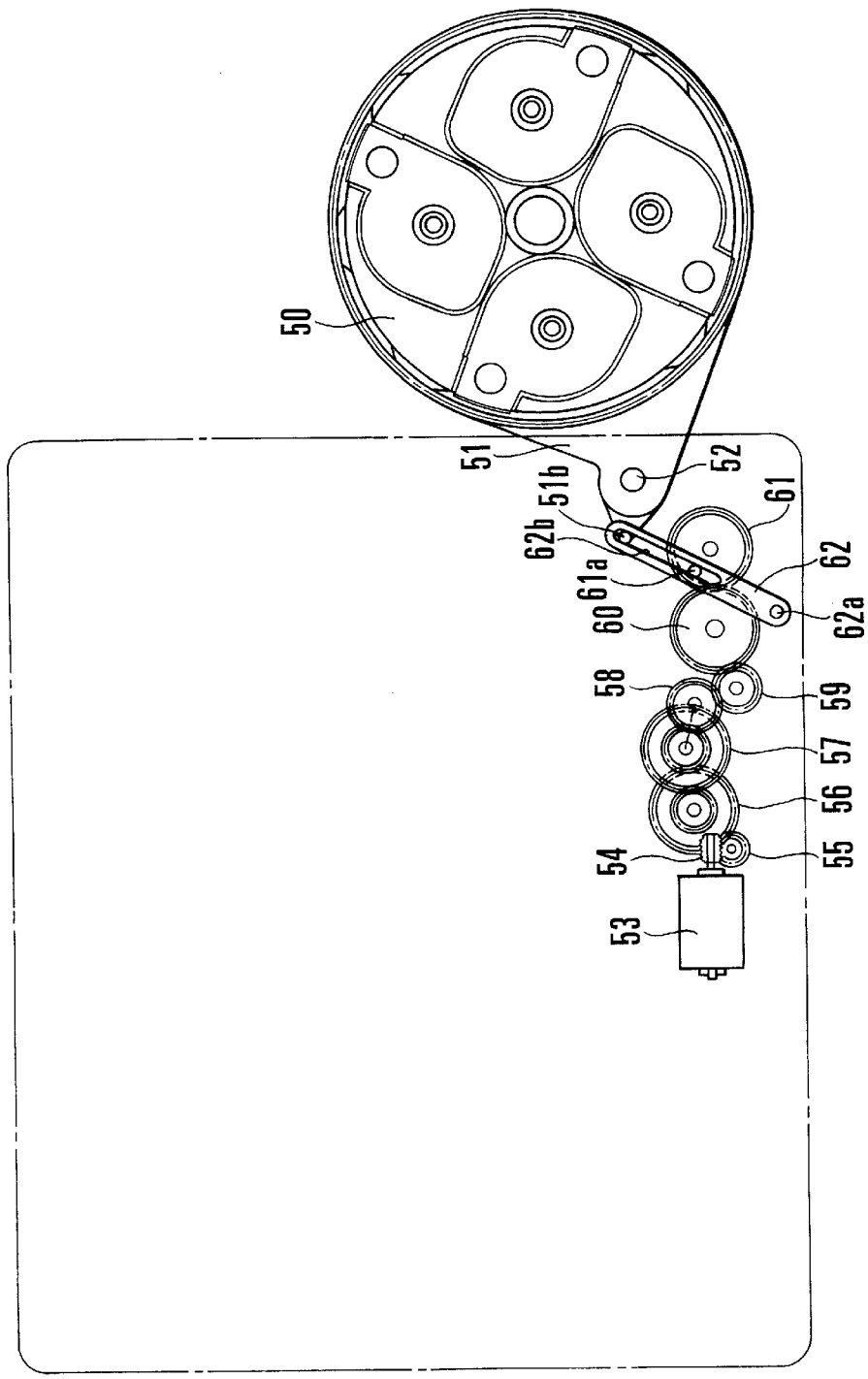
FIG. 9 is a plan view showing the second embodiment in a state of having the cartridge holder protruding from the apparatus.
Figure 10:
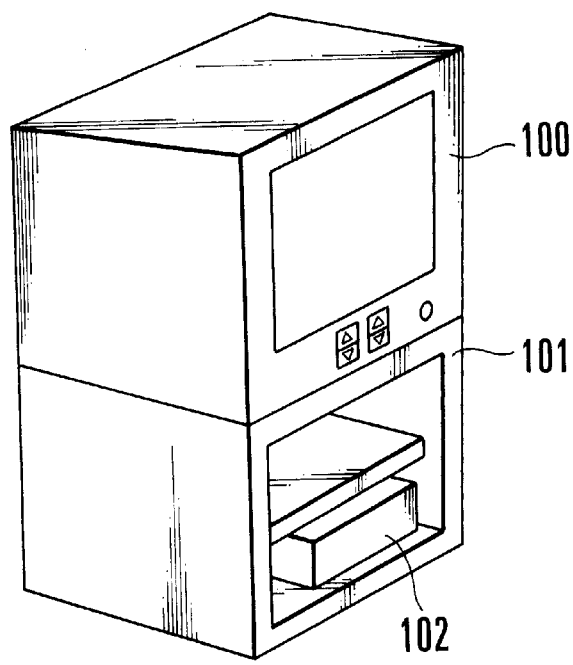
FIG. 10 is an oblique view showing by way of example a layout of a conventional film image reproducing apparatus.
Figure 11:
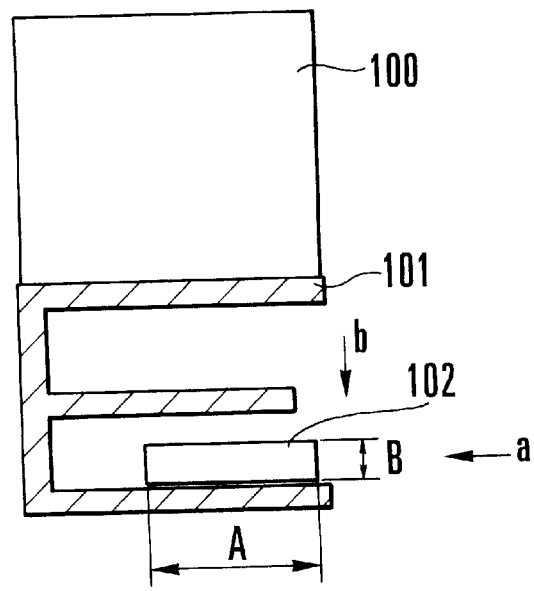
FIG. 11 is a section view also showing the conventional film image reproducing apparatus shown in FIG. 10.
Figure 12:
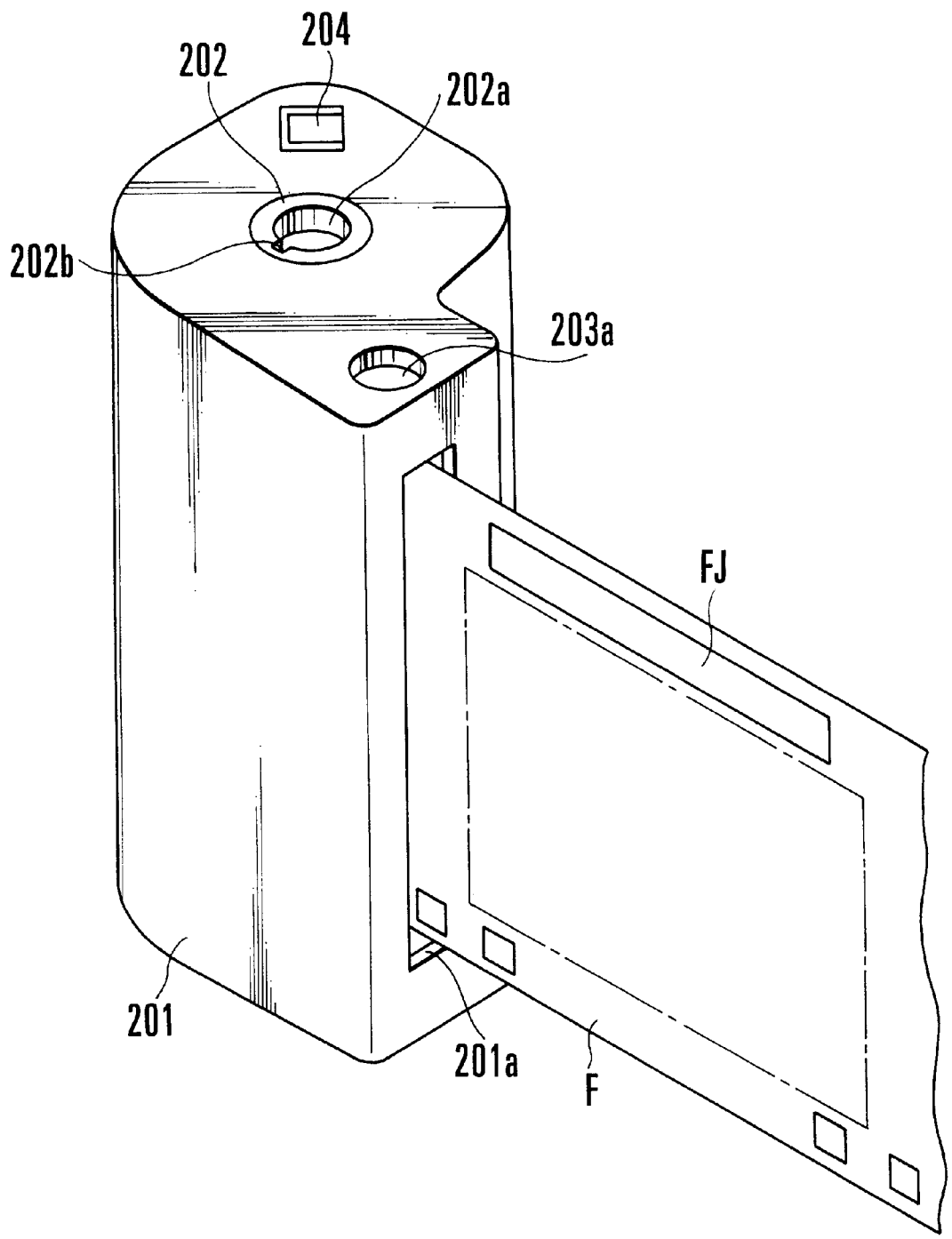
FIG. 12 is an oblique view showing the appearance of a film cartridge usable according to this invention.
Figure 13:
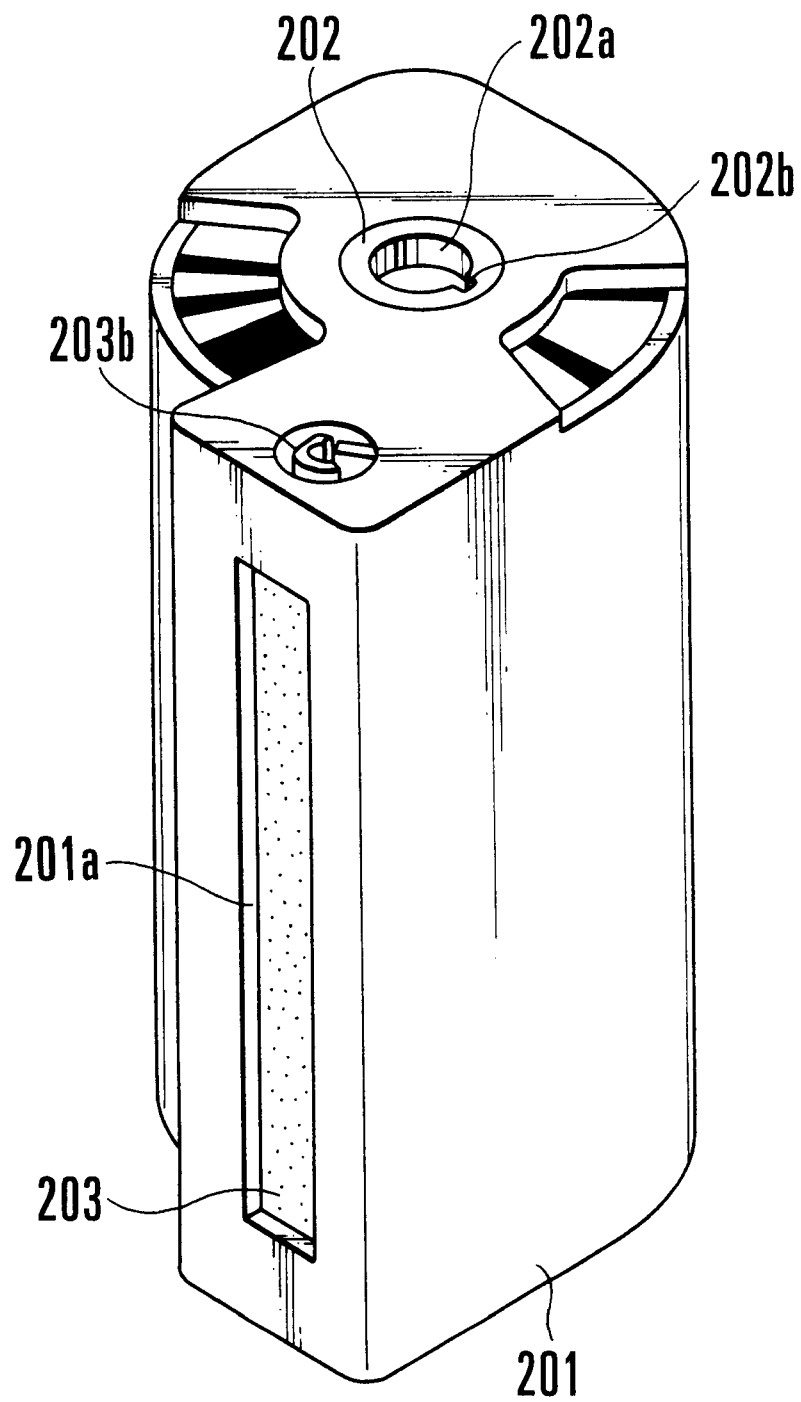
FIG. 13 is an oblique view of the same film cartridge as viewed from a different direction.
Figure 14:
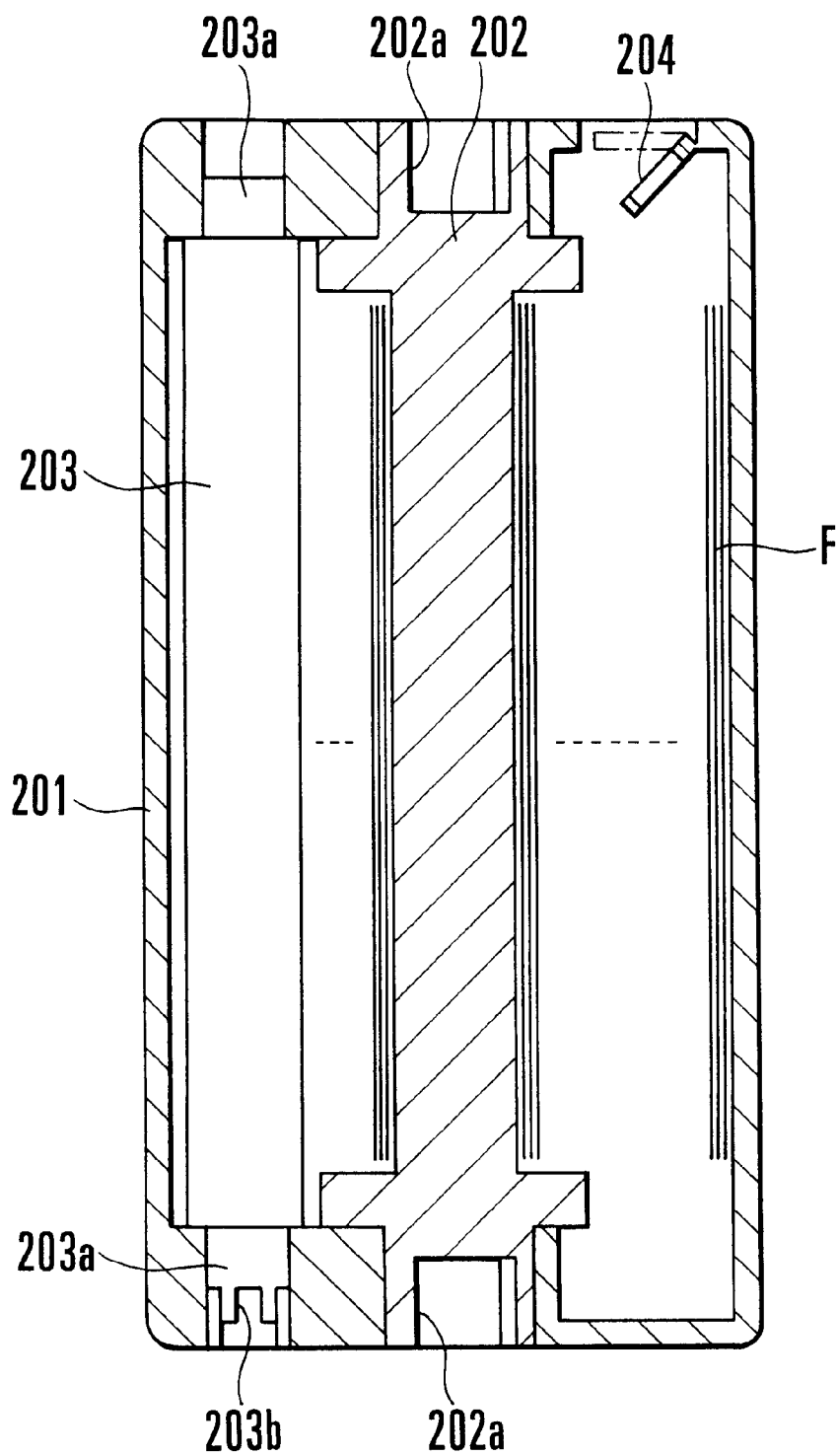
FIG. 14 is a section view of the film cartridge shown in FIG. 12.

FIGS. 8 and 9 show a second embodiment of this invention. While the holder tray of the first embodiment is arranged to linearly move to the outside of the apparatus body, the holder tray of the second embodiment is arranged to rotatively move to the outside of the apparatus body. In FIG. 8, the holder tray is shown in a state of having been stowed within the external shape of the apparatus body as indicated by a one-dot chain line. In FIG. 9, the holder tray is shown in a state of protruding to the outside of the apparatus body.

Referring to FIGS. 8 and 9, the cartridge holder 50 is provided with cartridge chambers 50a which are capable of stowing four thrust type film cartridges. A gear 50b is integrally formed on the periphery of the cartridge holder 50 and is connected to a gear train which will be described later herein. A holder tray 51 has a shaft 51a, on which the cartridge holder 50 is rotatably held.

The holder tray 51 is rotatable supported by a guide bar 52 which is in a shaft-like shape and which serves as a swinging fulcrum. The guide bar 52 is fixed to the apparatus body which is not shown. The illustration includes a motor 53, a worm gear 54, gears 55 and 56, and a sun gear 57. These gears form a gear train arranged to transmit the rotation of the motor 53. A planet gear 58 is arranged to be revolvable by meshing with the small gear part of the sun gear 57. Idle gears 59 and 60 form a gear train leading to a tray driving gear 61. A tray driving lever 62 is pivotally supported in such a way as to be swingable on a shaft hole 62a. The tray driving gear 61 is provided with a pin 61a which is fitted in a slot 62b of the tray driving lever 62. A pin 51b which is formed integrally with the holder tray 51 is also fitted in the slot 62b.

In the state shown in FIG. 8, the cartridge holder 50 is rotated with the planet gear 58 caused to mesh with the gear 50b in the same manner as in the case of the first embodiment.

In causing the holder tray 51 to protrude from the position shown in FIG. 8, the planet gear 58 revolves to mesh with the gear 59 almost in the same manner as in the first embodiment. The tray driving gear 61 is thus caused to rotate so as to swing the tray driving lever 62 in the CCW direction through the pin 61a.

The swinging motion of the tray driving lever 62 causes the pin 51b of the holder tray 51 to swing the holder tray 51 on the guide bar 52 in the CW direction, thereby causing the holder tray 51 to protrude from the apparatus body, as shown in FIG. 9. In the state shown in FIG. 9, the cartridge holder 50 is exposed to the outside of the apparatus body, so that the thrust type film cartridge can be easily loaded in the axial direction thereof.

In each of the first and second embodiments described above, the film cartridge holding device, i.e., the cartridge holder, is arranged by way of example to permit loading a maximum of four thrust type film cartridges. The cartridge holder, however, may be arranged to permit loading two or three thrust type film cartridges. Further, the cartridge holder may be arranged to omit the change-over (replacing) mechanism for the thrust type film cartridge and cause a cartridge holder allowing only one thrust type film cartridge to be stowed to protrude from the apparatus body for easy loading and unloading of the thrust type film cartridge in the axial direction thereof.

While the film cartridge holding device is built in the film image reproducing apparatus in the case of each of the first and second embodiments, the film cartridge holding device of the same kind of course may be built in a camera or a photofinisher apparatus.

In the case of the embodiments described above, the film cartridge holding device can be moved to a position where the film cartridge can be loaded without difficulty for loading the thrust type film cartridge in a cartridge dropping-in manner. Therefore, the film cartridges can be simply loaded and interchanged with each other.

According to the arrangement of each of the embodiments described above, a plurality of thrust type film cartridges can be easily loaded into and taken out from the apparatus in the axial direction of the film cartridge.

Since each of the embodiments described above is arranged to move each of the film cartridges to a desired position by rotating the film cartridge holding device, a plurality of film cartridges can be held without requiring any complex structural arrangement.

Further, according to the invention, a film image reproducing apparatus or the like which is capable of stowing a plurality of film cartridges can be simply arranged. Furthermore, the positions of the plurality of film cartridges can be shifted in turn from a film transport non-operable position to a film transport operable position and vice versa one after another.

According to the arrangement of each of the embodiments described above, nothing hinders loading of the film cartridge, so that the film cartridge dropping-in operation can be accomplished without difficulty.

The arrangement of each of the embodiments described above permits a reduction in size and cost of the apparatus as it does not require many drive sources such as motors.

The arrangement of each of the embodiments described above allows a greater amount of latitude in designing the shape of an apparatus arranged to hold one or a plurality of film cartridges, such as a film image reproducing apparatus, a photofinisher apparatus, a camera, etc. The arrangement further allows a greater amount of latitude also in deciding a place where the apparatus such as a film image reproducing apparatus, a photofinisher apparatus, or the like is to be installed.

According to the arrangement of each of the embodiments described above, a film image reproducing apparatus which is capable of stowing a plurality of thrust type film cartridges can be simply arranged and the positions of the stowed thrust type film cartridges can be changed from a film transport non-operable position over to a film transport operable position one after another.

FIGS. 12 to 23 relate to a film image reproducing apparatus which is arranged according to this invention as a third embodiment thereof. Of these drawings, FIG. 12 to 16 show the above-stated film cartridge which is used in the third embodiment.

Referring to FIGS. 12 to 16, the illustrations include a casing 201 of the film cartridge, a film egress/ingress slot 201a and a film supply spool 202. The film supply spool 202 has engaging holes 202a which are formed both in the upper and lower sides of the spool and which are provided with key ways 202b for engaging a fork which is not shown. A light-shielding door 203 is arranged to shield the film egress/ingress slot 201a from light. The light-shielding door 203 is provided with a rotation shaft 203a. A C-shaped engaging part 203b is formed at one end of the rotation shaft 203a. The film supply spool 202 and the rotation shaft 203a of the light-shielding door 203 are both rotatably held by the casing 201 of the film cartridge. A claw 204 is provided on one side of the casing 201 integrally with the casing 201. When an opening part is formed by bending the claw 204 as shown with a full line in FIG. 14, the opening part indicates that a film F accommodated in the film cartridge has been developed. If the opening part is not formed by bending the claw 204, as indicated with a broken line in FIG. 14, such a state indicates that the film F accommodated in the film cartridge has not yet been developed.

Figure 15:
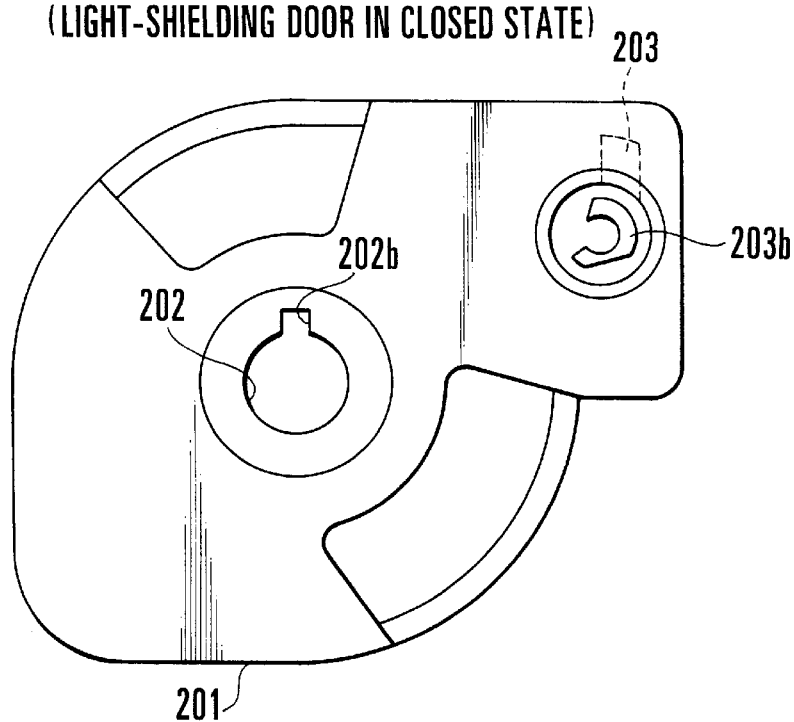
FIG. 15 is a side view of the film cartridge shown in FIG. 12.
Figure 16:
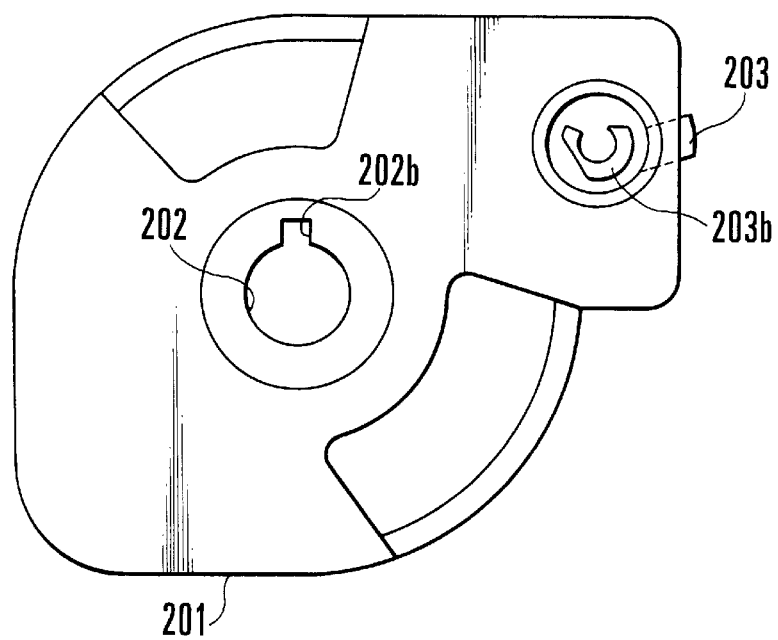
FIG. 16 is a side view of the film cartridge shown in FIG. 12.

FIG. 15 is a side view showing the film cartridge as having the light-shielding door 203 in a closed state. FIG. 16 is a side view showing the film cartridge as having the light-shielding door 203 in an open state. As shown in FIGS. 15 and 16, the light-shielding door 203 is swingable within a predetermined range of angle on the rotation shaft 203a. In opening the light-shielding door 203, a rotation shaft (which will be described later as an ALL opening-and-closing shaft) is caused to engage the engaging part 203b and, then, rotate clockwise. With the light-shielding door 203 in the open state as shown in FIG. 16, when the film supply spool 202 is caused to rotate clockwise, the film F is drawn out from the film egress/ingress slot 201a.

Figure 17:
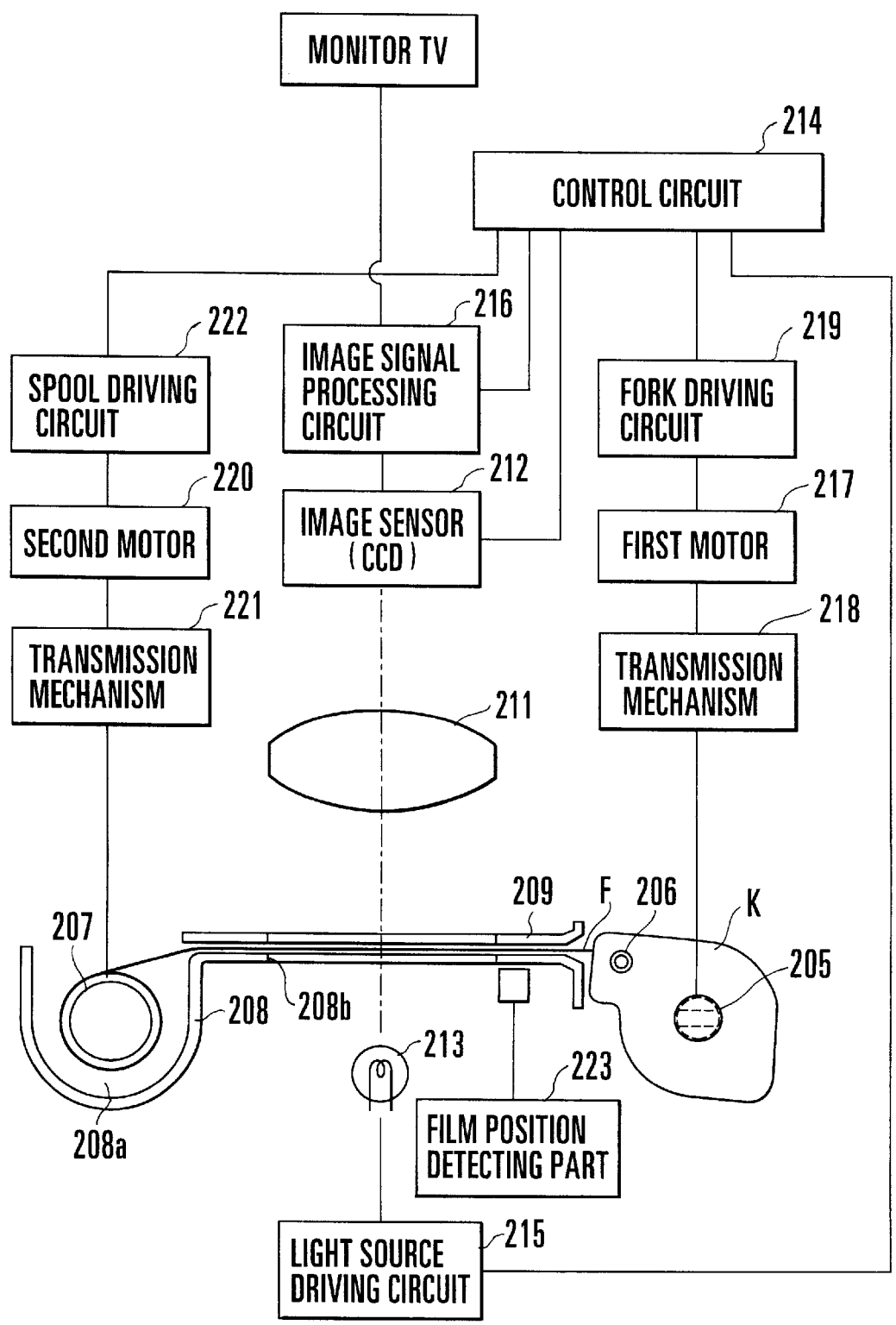
FIG. 17 is a block diagram showing the basic arrangement of a film image reproducing apparatus which is arranged as a third embodiment of this invention.
Figure 18:
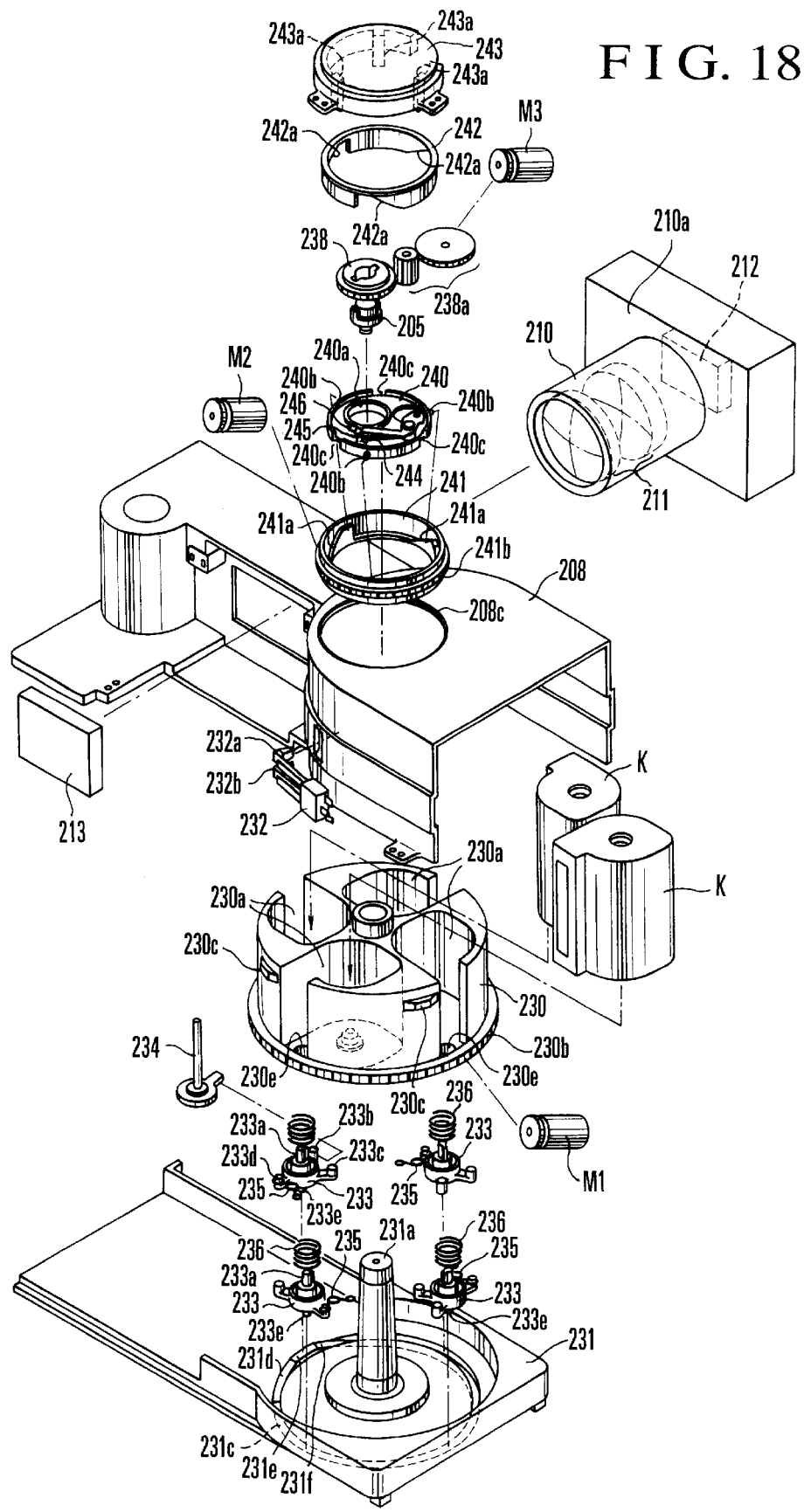
FIG. 18 is an exploded oblique view showing the film image reproducing apparatus which is the third embodiment of this invention.
Figure 19:
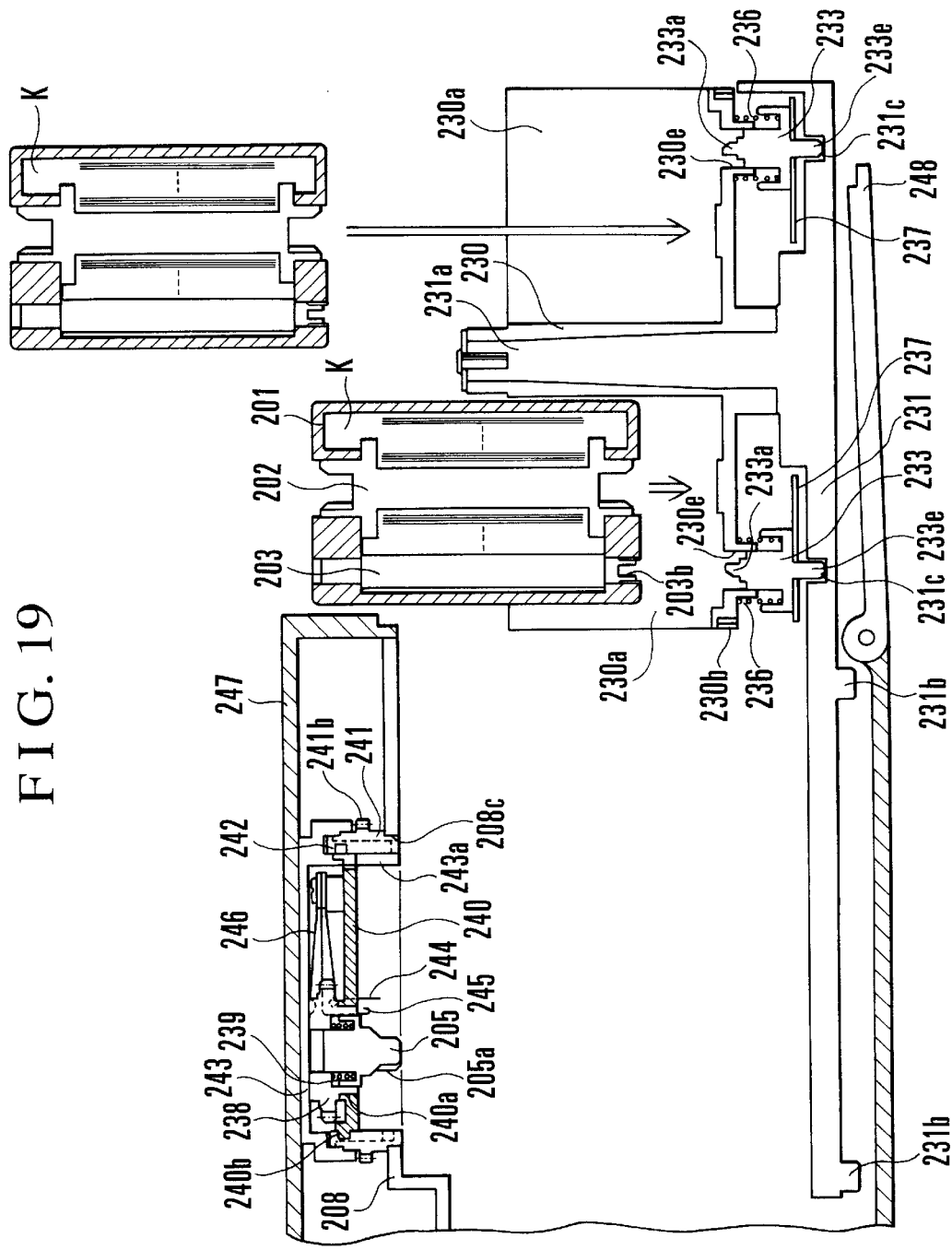
FIG. 19 is a section view showing the film image reproducing apparatus of FIG. 18 in a state of having a tray protruding from the apparatus.
Figure 20:
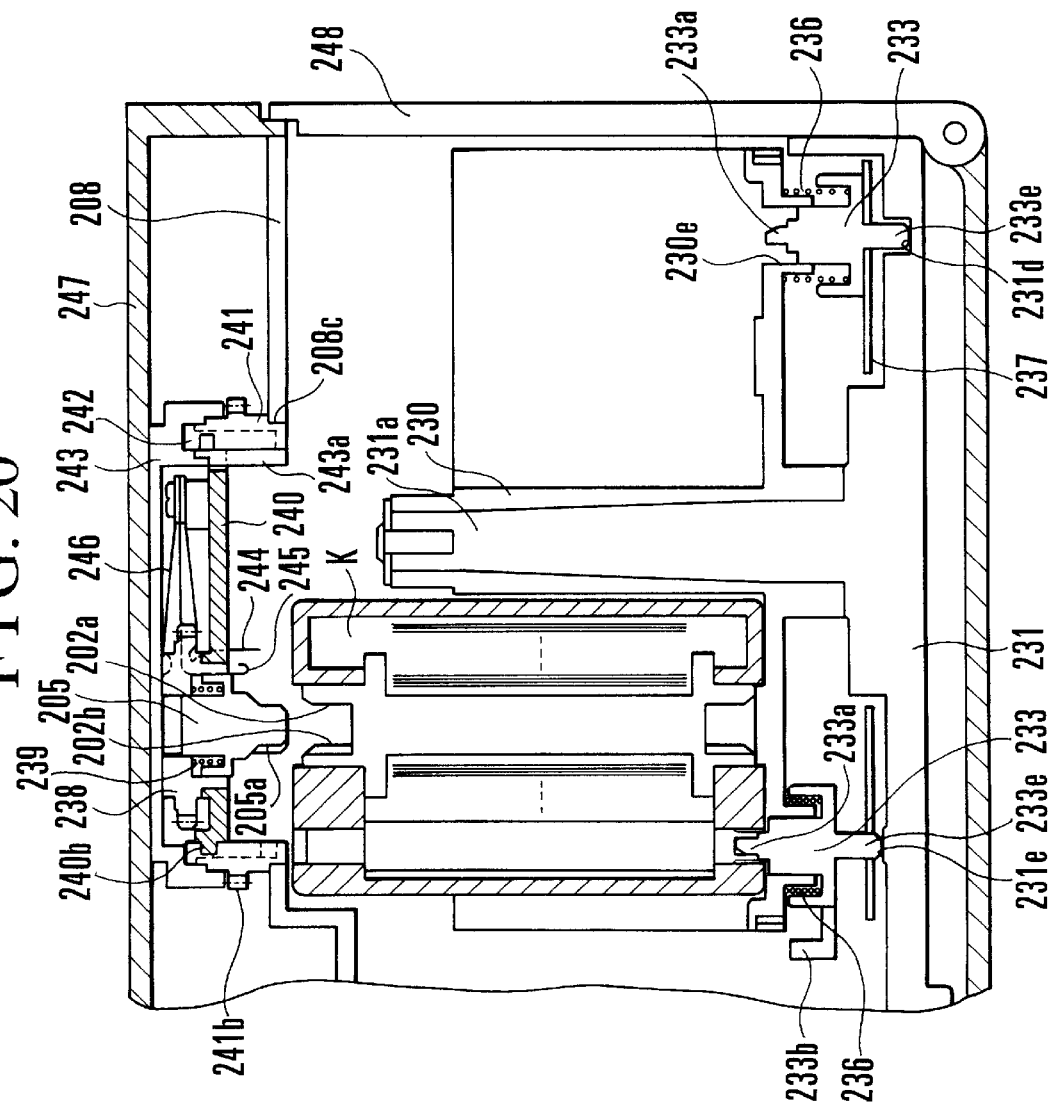
FIG. 20 is a section view showing the film image reproducing apparatus of FIG. 18 in a state obtained immediately after the tray is pulled in the apparatus.
Figure 21:
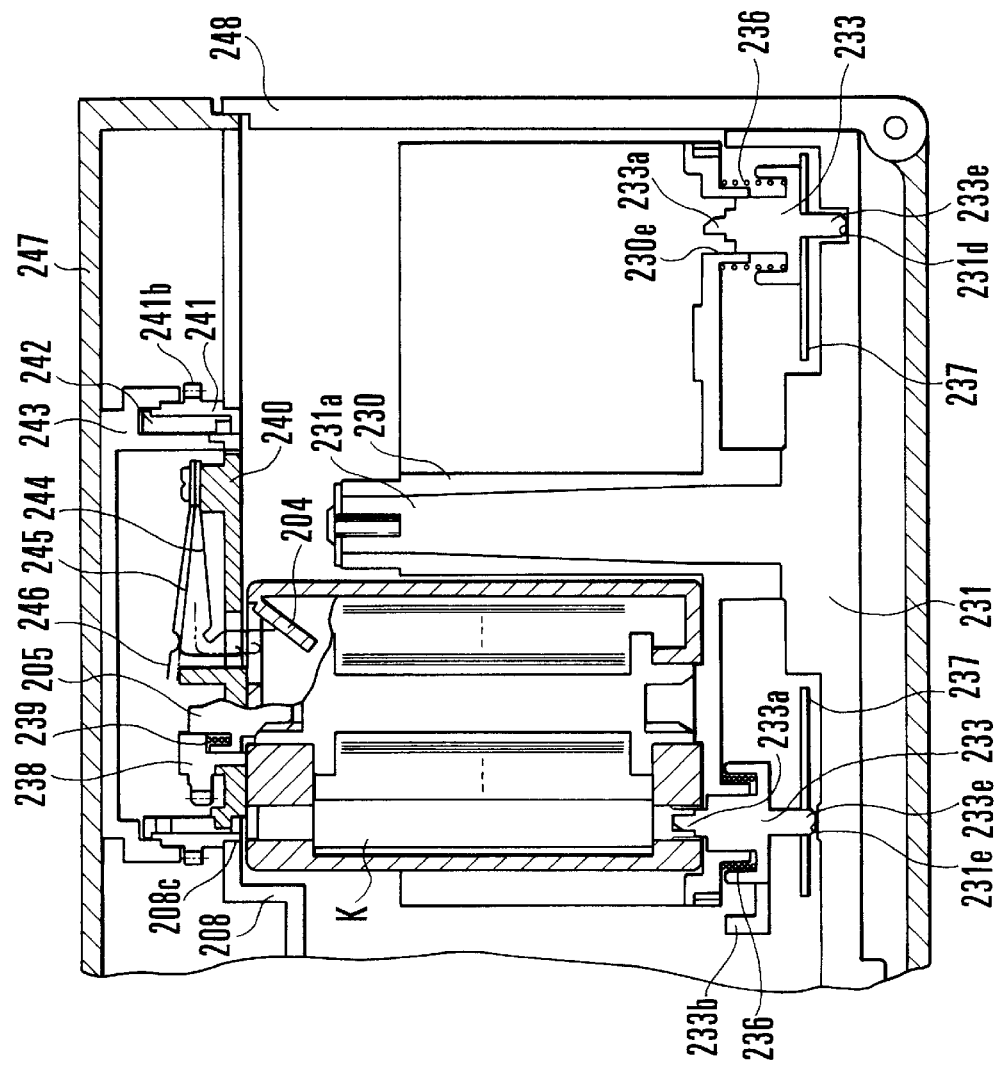
FIG. 21 is a section view showing the film image reproducing apparatus of FIG. 18 in a state in which a film is enabled to be transported.
Figure 22:
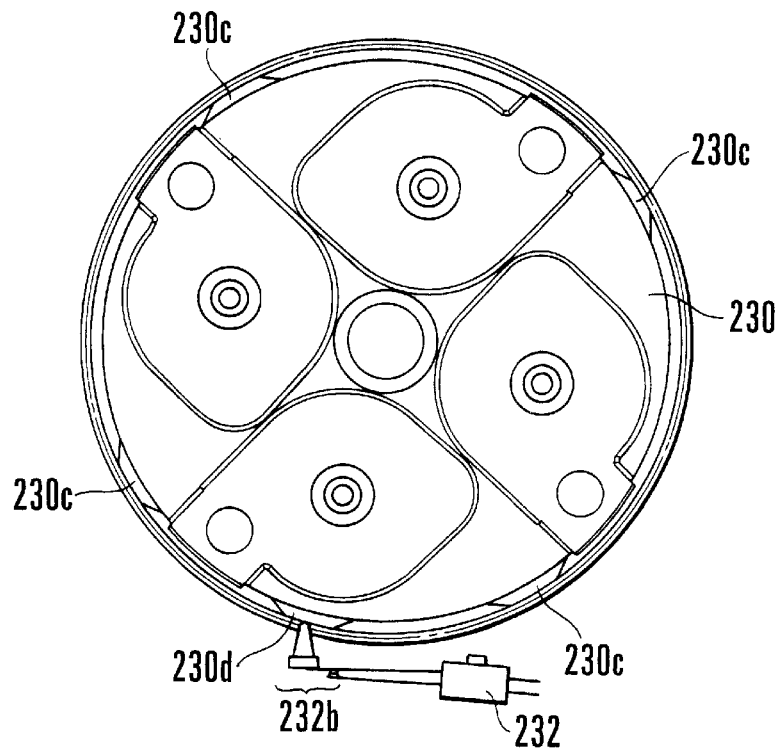
FIG. 22 shows a relation between a cartridge holder and a holder switch of the apparatus of FIG. 18.
Figure 23:
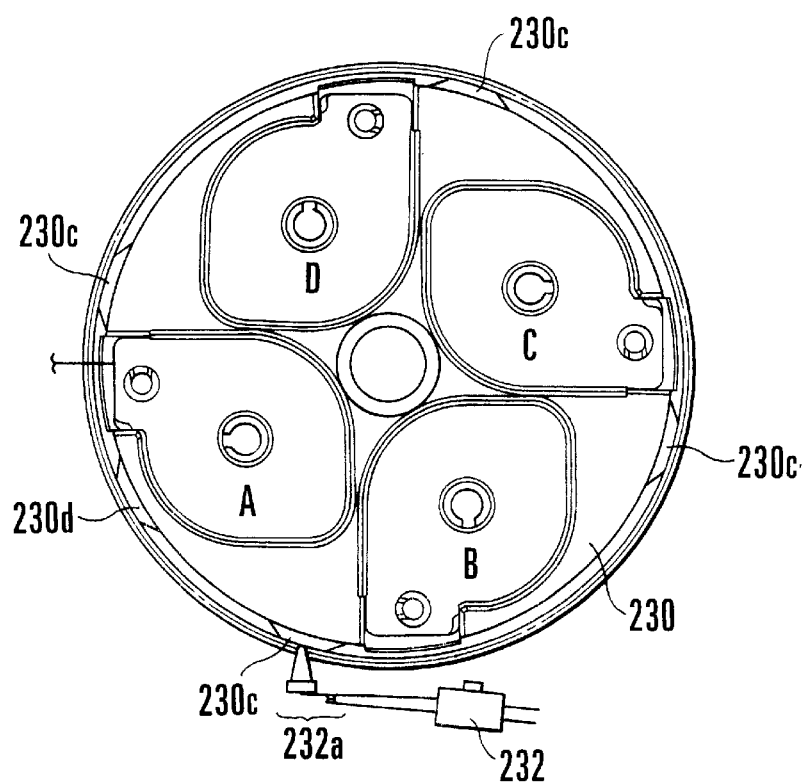
FIG. 23 also shows the relation between the cartridge holder and the holder switch of FIG. 18.

FIG. 17 is a block diagram showing the basic arrangement of the film image reproducing apparatus according to the third embodiment of this invention. FIG. 18 is an exploded oblique view showing the film image reproducing apparatus according to the third embodiment. FIGS. 19 to 21 are sectional views showing a part of the film image reproducing apparatus including the film cartridge 201 according to the third embodiment. FIG. 19 shows the holder tray in a state of protruding from the apparatus body so that the film cartridge can be either loaded or taken out in the axial direction thereof. FIG. 20 shows the holder tray in a state obtained immediately after the holder tray has been pulled into the apparatus body. FIG. 21 shows the film cartridge in a film transportable state with the fork engaging the film cartridge. FIGS. 22 and 23 each show a relation between the cartridge holder and the holder switch.

In the case of the third embodiment, the film image reproducing apparatus is connected through a cable to a TV monitor and is thus arranged to cause an image recorded on a developed film to be reproduced on the screen of the TV monitor.

The basic arrangement of the film image reproducing apparatus and the operation of its control system are described first with reference to FIG. 17 as follows.

A fork 205 is arranged to engage the film supply spool 202 of the film cartridge K. When the fork 205 rotates in the state of engaging the spool 202, the film F is sent out of the film cartridge K or rewound back into the film cartridge K. An ALL opening-and-closing shaft 206 is arranged to be capable of engaging the light-shielding door 203 of the film cartridge K. The light-shielding door 203 is opened or closed by the rotation of the ALL opening-and-closing shaft 206 in its engaged state. A take-up spool 207 for winding the film F thereon is rotatably supported within a spool chamber 208a, which is formed integrally with a body 208 of the apparatus. The take-up spool 207 is connected to a film transport gear train (not shown).

The body 208 is provided with an aperture part 208b for exposing the image plane of the developed film. A film pressing plate 209 is arranged to secure the flatness of the film F between the film pressing plate 209 and a film sliding face of the body 208 by preventing waving of the film F which is thin. The film pressing plate 209 also serves to restrict the position of the film F on the optical axis of the lens of the apparatus. In the film pressing plate 209, there is formed an opening part in a size corresponding to the image plane of the film F.

A photo-taking lens barrel 210 is arranged to hold an optical system 211. In addition to the optical system 211, an image sensor 212 which is a CCD or the like is also held by the photo-taking lens barrel 210 at its flange part 210a. A light source 213 is a planar light emitting type fluorescent lamp, a xenon lamp or the like and is arranged to illuminate the film F when the film F is drawn out from the film cartridge K. Light is thus projected onto the image plane on the developed film F from the light source 213. Transmitted light obtained through the film F then passes the aperture part 208b of the body 208 to be guided to the surface of the image sensor 212 through the optical system 211. As a result, an image is formed on the image sensor 212.

A control circuit 214 includes a microcomputer which presides control over the whole sequence of actions of the apparatus. A light source driving circuit 215 is arranged to drive the light source 213. An image signal processing circuit 216 is arranged to convert into a video signal an image on the film F picked up by the image sensor 212 which is a CCD or the like. A transmission mechanism 218 which consists of gears, etc., is arranged to transmit the output of a first motor 217 to the fork 205. A fork driving circuit 219 is arranged to drive the first motor 217.

A transmission mechanism 221 which consists of gears, etc., is arranged to transmit the output of a second motor 220 to the film take-up spool 207. A spool driving circuit 222 is arranged to drive the second motor 220.

With the third embodiment arranged in the above-stated manner, the spool driving circuit 222 is controlled according to a control signal coming from the control circuit 214. Then, the second motor 220 is driven by the spool driving circuit 222. The second motor 220 rotates the film take-up spool 207 through the transmission mechanism 221. The film F is thus wound on the take-up spool 207. Then, indexing one frame portion of the film F is made by detecting perforations provided in the film F at predetermined frame positions with a film position detecting part 223 which consists of, for example, a combination of light projecting means and light receiving means, such as an SPC or the like. The film winding action is controlled to bring it to a stop according to detection made by the film position detecting part 223.

With the image on the film F set in a position confronting the aperture part 208b of the body 208, the light source 213 is caused to light up by the light source driving circuit 215 according to a control signal from the control circuit 214. The light illuminating the image on the film F is guided through the optical system 211 to the image sensor 212. Upon receipt of a result of the image picking-up action of the image sensor 212, the image signal processing circuit 216 converts it into a video signal. The video signal is supplied through the cable to the TV monitor to reproduce the image the screen of the TV monitor.

When the operator wishes to rewind the film, a control signal is outputted from the control circuit 214 in response to an operation on an operation panel which is not shown. In response to the control signal, the fork driving circuit 219 drives the first motor 217 to cause the fork 205 to rotate through the transmission mechanism 218. With the fork 205 rotated, the film F is rewound into the film cartridge K.

FIGS. 18 to 23 relate to the action of the fork 205 and that of the ALL opening-and-closing shaft 233 in the film image reproducing apparatus according to the third embodiment of this invention.

Referring to FIGS. 18 to 23, a cartridge holder 230 is provided with cartridge chambers 230a which are arranged to be capable of stowing four film cartridges. A gear 230b is integrally formed on the periphery of the cartridge holder 230. The gear 230b is connected to a first motor M1 through a gear train which is not shown. A holder tray 231 has a shaft 231a formed integrally therewith. The cartridge holder 230 is held by the holder tray 231 in such a way as to be rotatable on the shaft 231a. Two guide shafts 231b are provided on the bottom surface of the holder tray 231. The guide shafts 231b are slidably fitted in guide grooves formed in a base plate (not shown) in such a way as to make the holder tray 231 movable between a position in which the holder tray 231 protrudes from the apparatus body 208 and a position in which the holder tray 231 is stowed within the apparatus body 208.

A holder switch 232 is composed of two switches for two channels including a first contact piece 232a and a second contact piece 232b. The rotating position of the cartridge holder 230 is detected when one of four projections 230c provided on the cylindrical surface of the cartridge holder 230 pushes the first contact piece 232a to turn on. With the rotating position thus detected, the cartridge holder 230 is caused to stop rotating in a position where the film F can be transported from the film cartridge K.

One projection 230d is provided on the cylindrical surface of the cartridge holder 230. The projection 230d is disposed at a height different from that of the four projections 230c in the direction of the rotation axis. The rotating position of the cartridge holder 230 is detected when the projection 230d pushes the second contact piece 232b to turn on. With the second contact piece 232b turned on, the position of the cartridge holder 230 when the holder tray 231 protrudes from the apparatus body 208 always can be specified.

The ALL opening-and-closing shaft 233, i.e., the ALL opening-and-closing shaft 206 in FIG. 17, is provided for every one of the four cartridge chambers 230a and is rotatably fitted in a hole 230e formed in the bottom of the cartridge chamber 230a. Each of the ALL opening-and-closing shafts 233 has a key formed at its fore end engaging shaft 233a. These parts are respectively arranged to be capable of engaging the rotation shaft of the light-shielding door of the film cartridge K.

Further, each of the ALL opening-and-closing shafts 233 is integrally provided with arm parts 233b and 233c which extend in the radial direction. An ALL driving lever 234 is disposed between the arm parts 233b and 233c. The ALL driving lever 234 is arranged to swing in such a way as to exert a rotating force onto the ALL opening-and-closing shaft 233. The driving force of the ALL driving lever 234 is derived from a drive source which is not shown. A toggle spring 235 is hooked on an arm part 233d of the ALL opening-and-closing shaft 233 and is arranged such that forces are exerted at both ends in the rotating direction of the ALL opening-and-closing shaft 233. Therefore, the arrangement gives a sufficient force to have the light-shielding door 203 completely opened or closed when the ALL opening-and-closing shaft 233 is engaging the film cartridge K.

A compression spring 236 is arranged to push the cam abutting part 233e of each of the ALL opening-and-closing shafts 233 against cam faces 231a, 231d, 231e and 231f which are provided on the holder tray 231. A retaining plate 237 (see FIG. 19) which is fixed with a screw to the cartridge holder 230 is arranged to prevent each of the ALL opening-and-closing shafts 233 from pulling away.

The fork 205 has a key 205a which is formed integrally therewith. A fork gear 238 is arranged to hold the fork 205 in such a way as to permit the fork 205 to axially (vertically) move to a slight extent without rotating relative to the fork gear 238. A compression spring 239 is internally disposed to urge the fork gear 238 and the fork 205 to move away from each other in the axial direction of the fork 205. This arrangement enables the fork 205 to engage and axially support the film supply spool 202 without being affected by ununiformity or inconstancy of the length of the film supply spool 202 of the film cartridge K. The fork gear 238 is connected to a third motor M3 via a gear train 238a.

The fork 205 is supported by a fork receiving plate 240, a fork lifting-and-lowering cam gear 241 and an upper cam ring 242 in combination. When the fork lifting-and-lowering cam gear 241 and the upper cam ring 242 are combined into one body with each other, lower cam faces 241a formed at three parts on the inner side of the fork lifting-and-lowering cam gear 241 and upper cam faces 242a formed at three parts of the upper cam ring 242 jointly form cam grooves. Each of the cam grooves is formed by the confronting pair of the cam faces 241a and 242a. The fork lifting-and-lowering cam gear 241 is rotatably fitted and held in a hole 208c which is provided in the upper surface of the body 208.

The fork gear 238 is rotatably fitted and held in a hole 240a of the fork receiving plate 240. Pins 240b which extend in the radial direction of the fork receiving plate 240 at three parts are respectively fitted into the above-stated cam grooves to act as cam followers. Cutout parts 240c axially formed at three parts in the periphery of the fork receiving plate 240 are guide parts. Rectilinear motion keys 243a which are formed on the inner side of an upper plate 243 at three parts along the axial direction thereof are slidably fitted in the cutout parts 240c.

Thus, the fork receiving plate 240 which is rectilinearly guided is arranged to vertically move up and down together with the fork gear 238 which has the fork 205 internally disposed therein, according to the rotation of the fork lifting-and-lowering cam gear 241 which forms the cam grooves.

The fork lifting-and-lowering cam gear 241 has a gear part 241b formed along its outer circumference. The gear part 241b is connected to a gear train which is not shown and is thus arranged to be rotated by a second motor M2. A claw detecting contact piece 244 is arranged to detect the presence or absence of the claw 204 of the film cartridge K. A cartridge detecting contact piece 245 is arranged to detect the presence or absence of the film cartridge K. There is also provided a ground (GND) contact piece 246. The claw detecting contact piece 244 detects whether or not the claw 204 of the film cartridge K is bent. If any film cartridge containing a film which has not yet been developed is loaded, the fore end of the claw detecting contact piece 244 abuts on the unbent claw 204 and then comes into contact with the ground contact piece 246 together with the cartridge detecting contact piece 245. The film of the cartridge is thus judged to be not developed. In a case where a film cartridge with the claw 204 bent is loaded, the fore end of the claw detecting piece 244 does not come into contact with the ground contact piece 246 as it comes into an opening formed by the bent claw 204, so that the film cartridge can be judged to contain a developed film. The fore end of the cartridge detecting contact piece 245 is located where the outside of the film cartridge comes and is arranged to come into contact with the ground contact piece 246 in the presence of the film cartridge and does not come into contact with the contact piece 246 in the absence of the film cartridge, so that the presence or absence of the film cartridge can be detected.

The claw detecting contact piece 244, the cartridge detecting contact piece 245 and the ground contact piece 246 are fixed together with a screw to the fork receiving plate 240 with insulating plates inserted in between them. Reference numeral 247 denotes an external cover. A lid 248 covers an opening part provided for allowing the holder tray 231 to egress and ingress. The lid 248 is thus opened or closed according to the egress and ingress of the holder tray 231.

An engaging action of the ALL opening-and-closing shaft and the ascending and descending actions of the fork in the film image reproducing apparatus according to the third embodiment are next described as follows.

In loading the apparatus with the film cartridge K, the operator drops the film cartridge K into the cartridge chamber 230a in the axial direction of the film cartridge K (in the direction of a white arrow), as shown in FIG. 19, with the lid 248 opened and the holder tray 231 protruding out of the apparatus body. In this instance, the rotating position of the cartridge holder 230 is as shown in FIG. 22. FIG. 22 shows also the relation of the cartridge holder 230 to the second contact piece 232b of the holder switch 232. The rotating position of the cartridge holder 230 shown in FIG. 22 is obtained by rotating and stopping it immediately before the holder tray 231 comes to protrude from the apparatus body.

In other words, when an operation is performed to cause the holder tray 231 to protrude, the driving action of the first motor M1 causes the cartridge holder 230 to rotate. Then, the cartridge holder 230 comes to a stop where the projection 230d which is provided in one place on the cartridge holder 230 pushes the second contact piece 232b to turn on. Following that, the protruding action of the holder tray 231 is performed. When the holder tray 231 is protruding from the apparatus body, therefore, the cartridge holder 230 is always at a specific position in the rotating direction thereof. With the apparatus loaded with the four film cartridges, in displaying or reading images from the film cartridges, one after another, the arrangement thus enables the operator to easily know from which of the film cartridges the film can be transported.

When the holder tray 231 is protruding as shown in FIG. 19, all the four ALL opening-and-closing shafts 233 have been pulled down from the bottom of the cartridge chamber 230a by the spring force of the springs 236, so that each film cartridge K can be smoothly dropped down into the cartridge chamber 230a without hindrance. In other words, when the cartridge holder 230 is in the rotating position as shown in FIG. 22, the cam abutting parts 233e of all the ALL opening-and-closing shafts 233 are abutting on the lower cam faces 231a of the holder tray 231 among the cam faces of the holder tray 231.

After completion of loading the film cartridges K, a holder tray moving mechanism (not shown) is driven by operating the operation panel (not shown). The holder tray 231 is moved toward the apparatus body and, then, stowed inside of the apparatus body. Subsequently, the cartridge holder 230 rotates, and the projection 230c then comes to push the first contact piece 232a of the holder switch 232 to turn on. By this, the rotation of the cartridge holder 230 is brought to a stop. In this state, the film cartridge A is in the film transport operable position for displaying (reading) an image recorded on the film contained in the film cartridge A. Other film cartridges B, C and D are stopped in the film transport non-operable position.

More specifically, the ALL opening-and-closing shaft 233 which is disposed at the cartridge chamber 230a in which the film cartridge A is loaded has the cam abutting part 233e climbing a slanting face 231d from the cam face 231a of the holder tray 231 and coming to abut on a higher face 231e of the holder tray 231, according to the rotation of the cartridge holder 230. Then, as shown in FIG. 20, the engaging shaft 233a of the ALL opening-and-closing shaft 233 comes to engage the rotation shaft engaging part 203b of the light-shielding door 203 of the film cartridge K.

Under this condition, when an operation is performed to rotate the cartridge holder 230 for replacing the film cartridge currently used for a display (reading) with another film cartridge, the film cartridge B shown in FIG. 23 comes to the film transport operable position. According to the rotation of the cartridge holder 230, the cam abutting part 233e of the ALL opening-and-closing shaft 233 which has been engaging the film cartridge A then descends the slanting face 231f from the cam face 231e of the holder tray 231 to come to abut on the lower face 231a. As a result, the engaging shaft 233a disengages from the film cartridge A. At the same time, another ALL opening-and-closing shaft 233 comes to engage the film cartridge B in the same manner as in the case of the film cartridge A.

Following the state of FIG. 20, the second motor M2 is driven to cause the fork lifting-and-lowering cam gear 241 to rotate. Then, the pin 240b descends along the cam groove formed jointly by the cam face 241a of the fork lifting-and-lowering cam gear 241 and the cam face 242a of the upper cam ring 242. The descent of the pin 240b causes the fork receiving plate 240 to descend together with the fork gear 238 in which the fork 205 is disposed. The fork 205 then comes to engage the engaging hole 202a of the film supply spool 202 of the film cartridge K, as shown in FIG. 21. Further, when the key 205a of the fork 205 engages the key way 202b of the film supply spool 202, the film cartridge becomes ready for sending the film out.

Further, the claw detecting contact piece 244, the cartridge detecting contact piece 245 and the ground (GND) contact piece 246 which are fixed to the fork receiving plate 240 descend along with the fork receiving plate 240 so as to detect the presence or absence of the film cartridge K and the bent state of the claw 204 of the cartridge K. If the absence of the film cartridge K is detected, the fork 205 is immediately moved upward and the cartridge holder 230 is caused to rotate so as to set another cartridge chamber in the film transport operable position. If it is detected that a film cartridge containing an undeveloped film therein has been loaded, the operator can be informed of this result of detection by displaying it on the TV monitor before the film is sent out from the film cartridge in question.

The film sending and rewinding actions are carried out by driving the third motor M3. Since the fork gear 238 moves upward or downward along with the fork receiving plate 240, a gear which is in mesh with the fork gear 238 among the gear train 238a is formed long enough not to disengage the fork gear 238 irrespective of the position of the fork gear 238 in the vertical direction.

Figure 24:
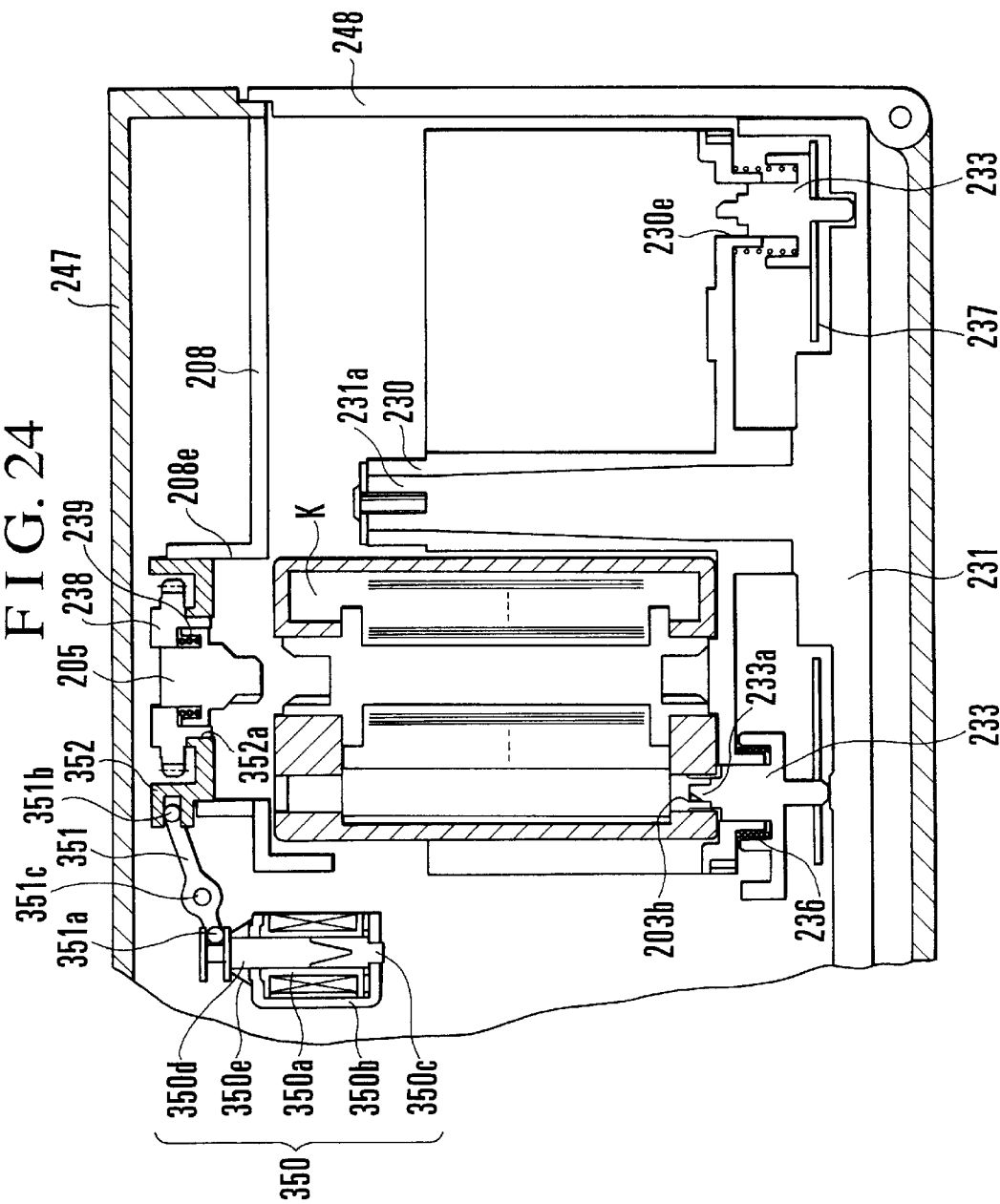
FIG. 24 is a section view showing a film image reproducing apparatus which is a fourth embodiment of this invention in a state obtained immediately after a tray is pulled in the apparatus.
Figure 25:
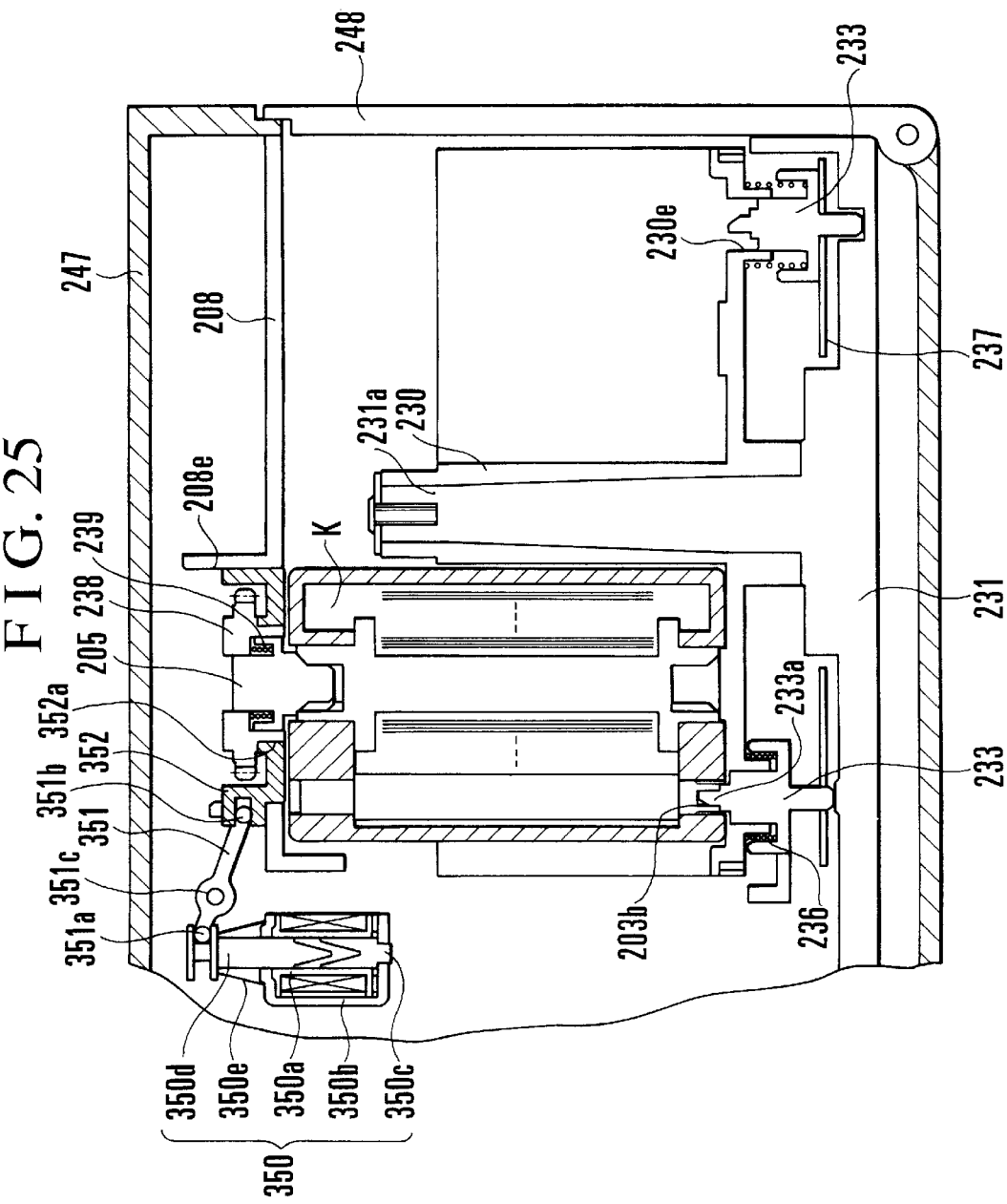
FIG. 25 is a section view showing the film image reproducing apparatus which is the fourth embodiment in a state in which a film is enabled to be transported.

FIGS. 24 and 25 show a fourth embodiment of this invention. The fourth embodiment is arranged similarly to the third embodiment except in the following point. While the fork receiving plate of the third embodiment is arranged to move upward or downward along the cam groove, the fork receiving plate of the fourth embodiment is arranged to move upward or downward in association with the motion of a moving iron core of a plunger.

Since the vertical motion of the ALL opening-and-closing shaft 233 is arranged to be the same as in the third embodiment, details of that motion are omitted from the following description. FIG. 24 illustrates a state obtained immediately after the holder tray is pulled into the apparatus body. In the state of FIG. 24, the ALL opening-and-closing shaft is engaging the film cartridge. FIG. 25 illustrates a state in which the fork is engaging the film cartridge to have the film cartridge in the film transport operable position. All the parts that are the same as those of the third embodiment are indicated by the same reference numerals and are omitted from the following description.

Referring to FIGS. 24 and 25, a solenoid type plunger 350 is composed of a bobbin 350a formed with a conductor coil wound thereon, a yoke 350b, a fixed iron core 350c fitted inside the bobbin 350a and fixed to the yoke 350b, a moving iron core 350d fitted inside the bobbin 350a and arranged to be movable in the direction of axis of the bobbin 350a, and a compression spring 350e arranged to exert a force in such a direction as to pull the moving iron core 350d away from the fixed iron core 350c.

An interlocking lever 351 has its one end 351a engaging the head part of the moving iron core 350d and the other end engaging a fork receiving plate 352. A support shaft 351c supports the interlocking lever 351 in such a way as to allow the interlocking lever 351 to swing on the shaft 351c. The fork gear 238 is rotatably fitted in a hole 352a provided in the fork receiving plate 352. The fork receiving plate 352 is fitted in a cylindrical hole 208e of the apparatus body 208 in such a way as to be slidable upward and downward.

With the fourth embodiment arranged in the above-stated manner, when the plunger 350 is not energized, the moving iron core 350d is pulled away from the fixed iron core 350c by the force of the compression spring 350e. Therefore, the fork receiving plate 352 is lowered toward the cartridge chamber 230a through the interlocking lever 351. Then, as shown in FIG. 25, the fork 205 is engaging the film supply spool engaging hole 202a of the film cartridge K. To change the film cartridge to be used for displaying (reading) from one film cartridge over to another under this condition, when the plunger 350 is first energized before rotating the cartridge holder 230 by operating the operation panel which is not shown, the moving iron core 350d is attracted toward the fixed iron core 350c. The fork receiving plate 352 is caused to move upward through the interlocking lever 351 as shown in FIG. 24. As a result, the fork 205 disengages from the film cartridge K.

After that, the cartridge holder 230 is rotated. The holder tray 231 is then caused to protrude. The film cartridge to be used for the image display is thus changed from one film cartridge over to another. After the change-over, the holder tray 231 is pulled back to the stowed position within the apparatus body. The cartridge holder 230 is rotated to set a desired film cartridge in the film transport operable position. The plunger 350 is then deenergized. The fork 205 then comes to engage the film supply spool engaging hole 202a of the film cartridge K.

Figure 26:
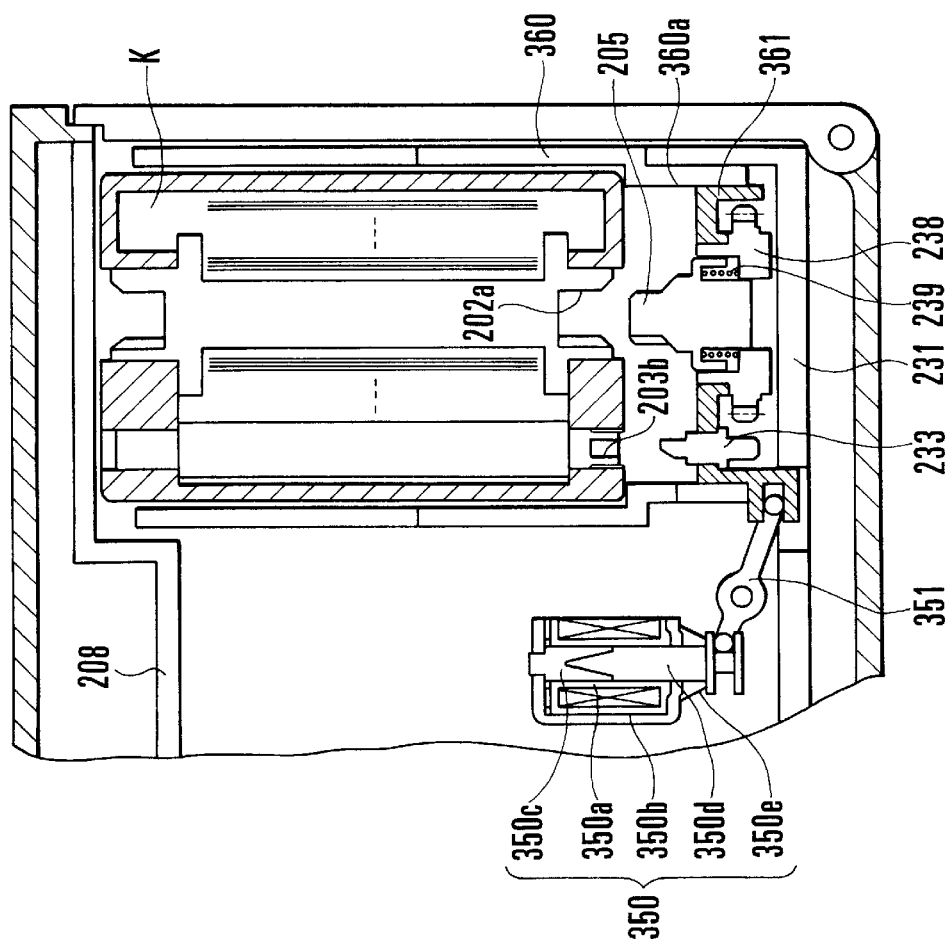
FIG. 26 is a section view showing a film image reproducing apparatus which is a fifth embodiment of this invention in a state obtained immediately after a tray is pulled in the apparatus.
Figure 27:
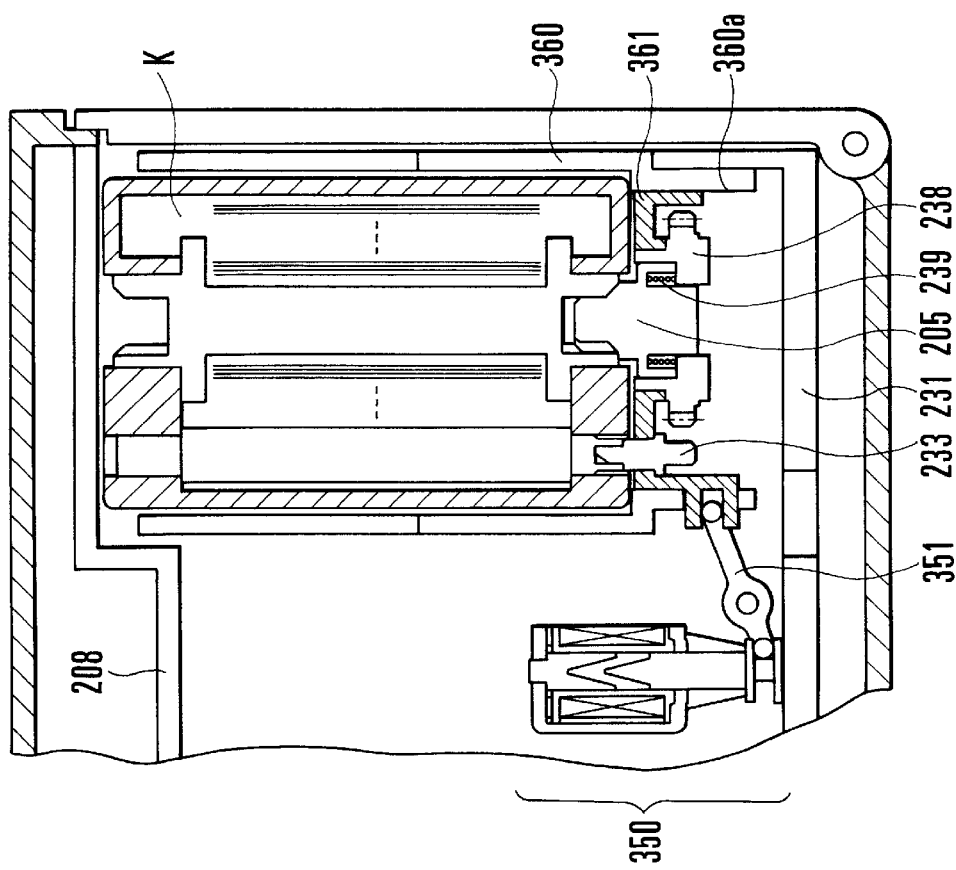
FIG. 27 is a section view showing the film image reproducing apparatus which is the fifth embodiment in a state of having a film is enabled to be transported.
Figure 28:
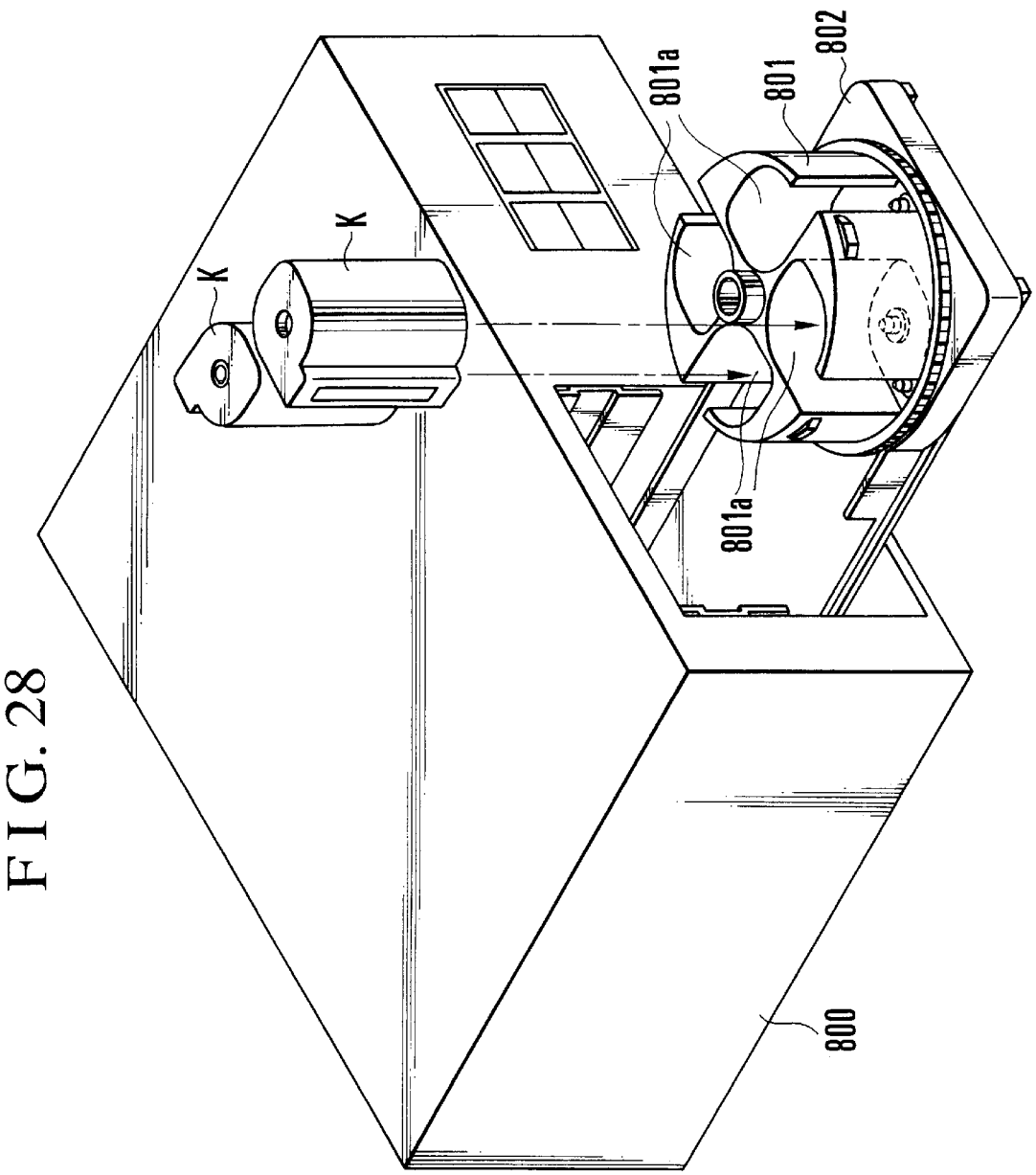
FIG. 28 is an oblique view showing a film image reproducing apparatus which serves as a prerequisite for the third to fifth embodiments.
Figure 29:
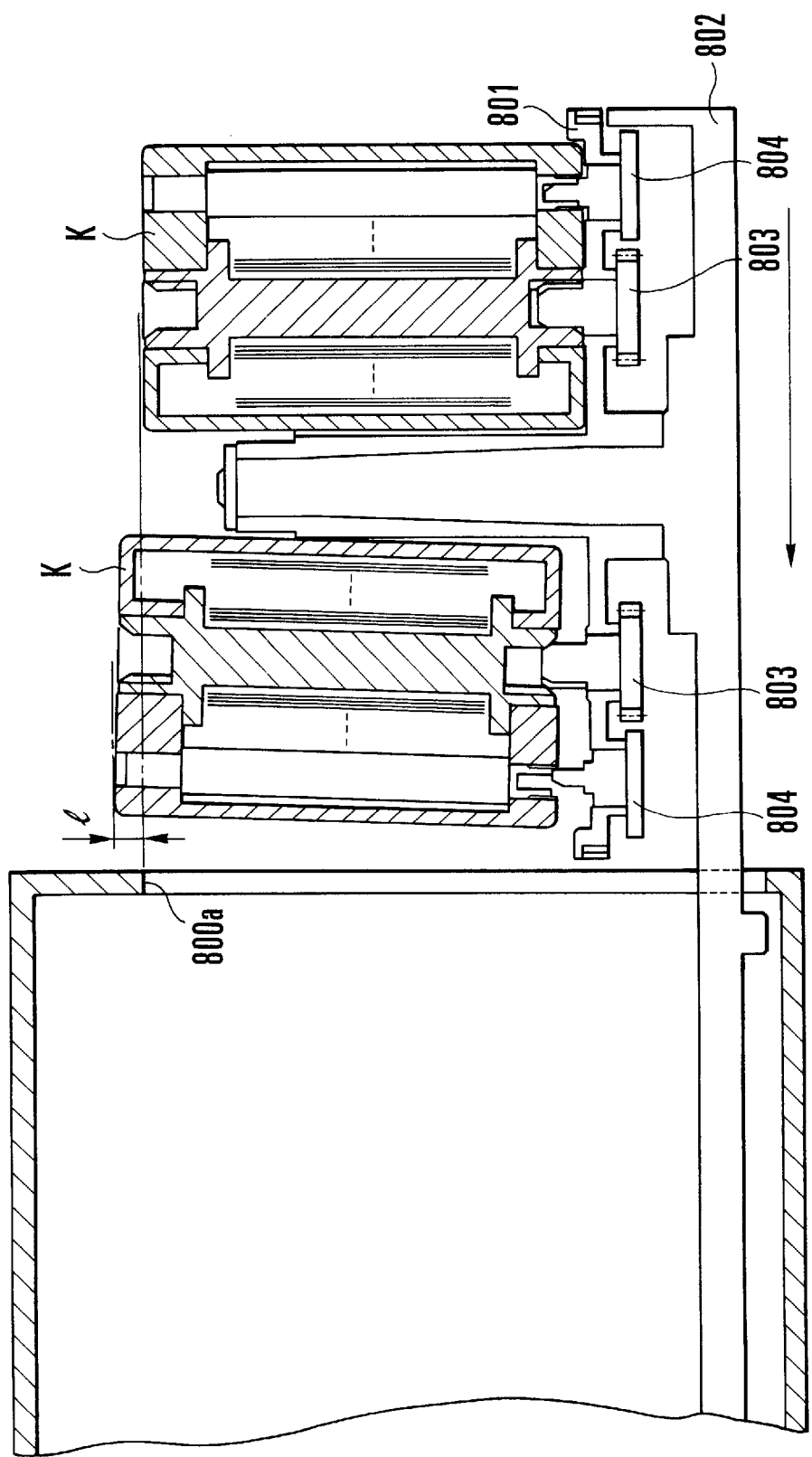
FIG. 29 is a section view showing the film image reproducing apparatus shown in FIG. 28.

FIGS. 26 and 27 show a fifth embodiment of this invention. The fifth embodiment is arranged similarly to the fourth embodiment except the following point. In the case of the fifth embodiment, the ALL opening-and-closing shaft and the fork are arranged to be held by one and the same member and to be moved upward and downward together. The drive source for their vertical motion is also a solenoid type plunger 350 like in the fourth embodiment.

FIG. 26 illustrates a state obtained immediately after the holder tray is pulled back into the apparatus body. In this state, both the ALL opening-and-closing shaft 233 and the fork 205 are not engaging the film cartridge K. FIG. 27 illustrates a state in which the ALL opening-and-closing shaft 233 and the fork 205 are engaging the film cartridge K so as to set the film cartridge K in the film transport operable position. All the parts that are the same as those of the third and fourth embodiments are indicated by the same reference numerals and details of them are omitted from the following description.

Referring to FIGS. 26 and 27, a cartridge holder 360 is arranged to be capable of stowing only one film cartridge K therein. A receiving plate 361 is arranged to rotatably hold the ALL opening-and-closing shaft 233 and the fork gear 238. The receiving plate 361 is fitted in an inner diametral hole 360a of a cylindrical part of the cartridge holder 360 in such a way as to be slidable upward and downward. The vertical motion of the receiving plate 361 is caused through the interlocking lever 351 by the solenoid type plunger 350 which is arranged in the same manner as in the fourth embodiment.

With the holder tray 231 stowed in the apparatus body, when the supply of electric power to the plunger 350 is cut off, the force of the spring 350e causes the moving iron core 350d to part from the fixed iron core 350c. The receiving plate 361 is caused to move upward through the interlocking lever 351. Then, the ALL opening-and-closing shaft 233 comes to engage the light-shielding door rotation shaft engaging part 203b of the film cartridge K, while the fork 205 comes to engage the film supply spool engaging hole 202a of the film cartridge K.

This invention is applied by way of example to the film image reproducing apparatus in the case of the third, fourth and fifth embodiments. However, the arrangements of these embodiments are applicable also to other apparatuses of the kind using film cartridges, such as a camera, a photofinisher apparatus, etc.

In each of the above-stated embodiments, the engaging member provided for opening and closing the light-shielding member of the film cartridge and for film transport is arranged to be movable with respect to the film cartridge loaded in the film cartridge holding portion. Therefore, in loading the film cartridge into the film cartridge holding portion, the film cartridge can be correctly loaded without being hindered by the engaging member. After loading, the engaging member is moved to a predetermined position where the film can be transported.

Therefore, in accordance with this invention, an image reproducing apparatus, a photofinisher apparatus, a camera or the like can be arranged to permit loading a film cartridge and transporting a film, only requiring the operator to just drop the film cartridge, for example, into the film cartridge holding portion.

According to the arrangement of each of the embodiments described above, the position of the film transport member relative to the light-shielding door opening-and-closing member is not fixed and is variable according to various conditions. Therefore, if they are arranged on one side of the apparatus, an engaging member moving means can be commonly used for them. Such an arrangement is applicable also to an image reproducing apparatus, a photofinisher apparatus, a camera, or the like, for reduction in size and cost of the apparatus.

The arrangement of each of the embodiments described above permits making a decision as to whether an image reproducing action, a developing action, a photo-taking action or the like is to be carried out, for example, according to whether the film contained in the film cartridge has been developed or not. Further, in the event of absence of a film cartridge from a predetermined position, a film cartridge in a next film cartridge holding portion can be moved to the predetermined position, so that film cartridges can be speedily and automatically supplied.

Figure 30:
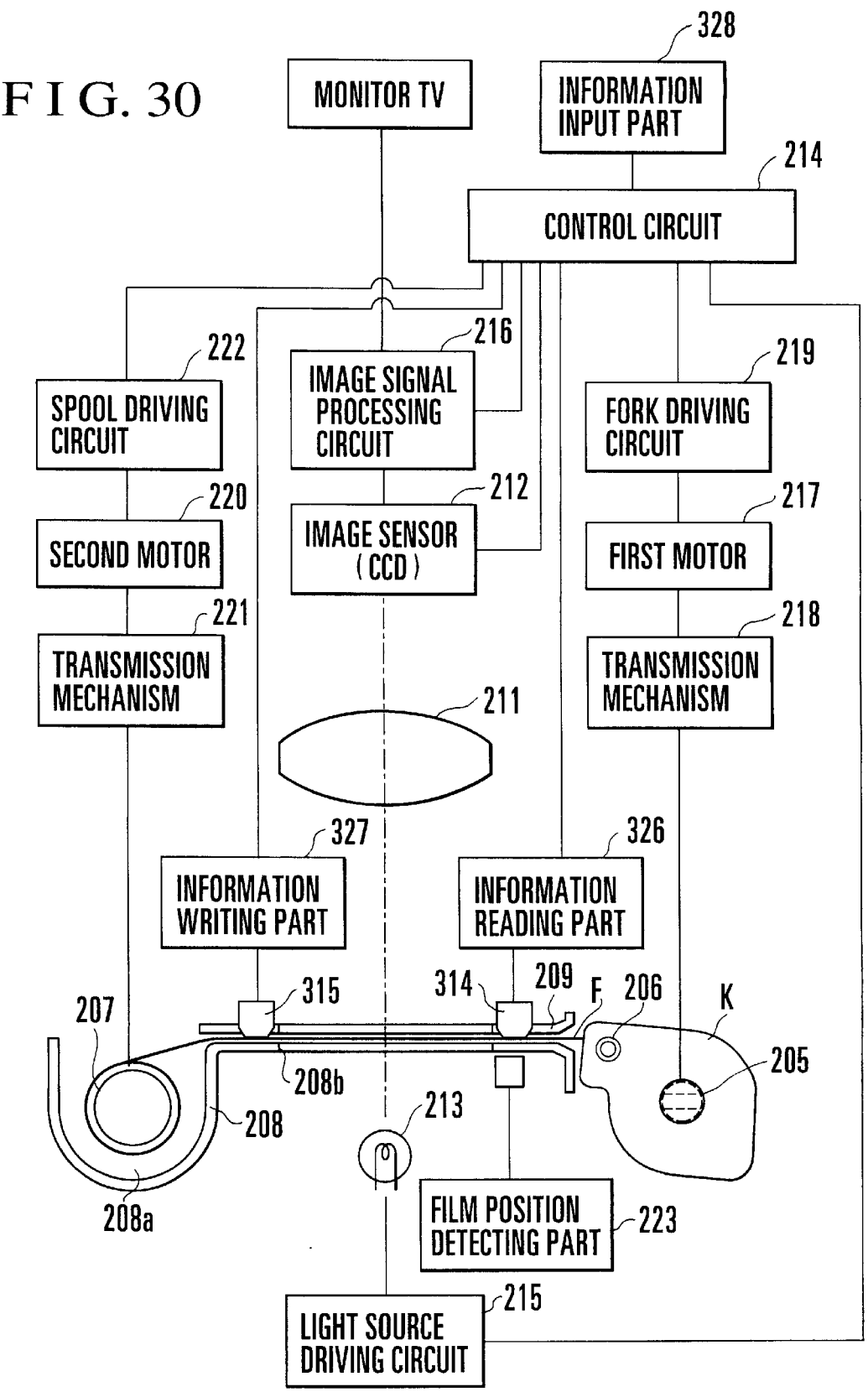
FIG. 30 is a block diagram showing the basic arrangement of a film image reproducing apparatus which is arranged as a sixth embodiment of this invention.
Figure 31:
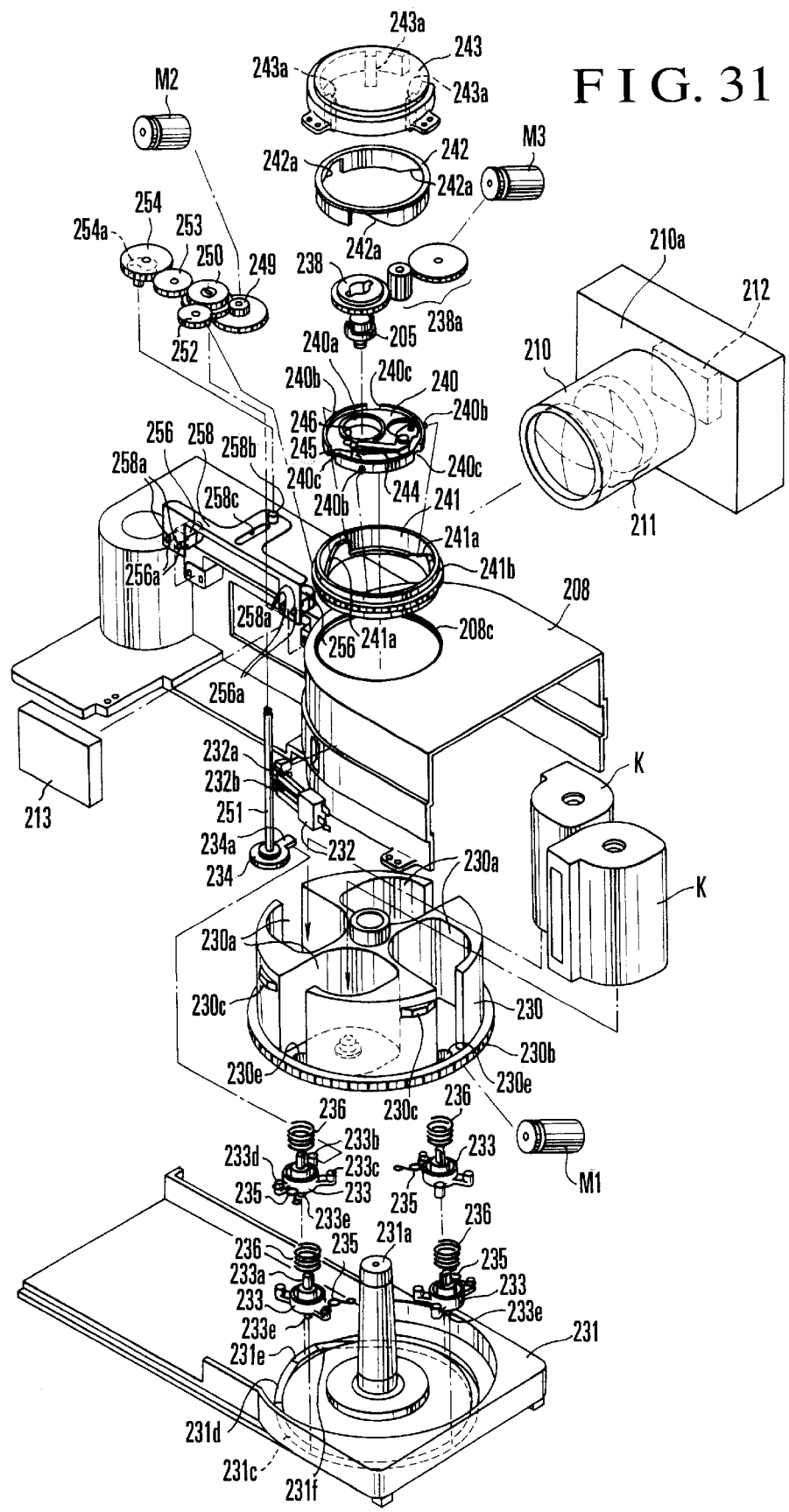
FIG. 31 is an exploded oblique view of the film image reproducing apparatus shown in FIG. 30.

A sixth embodiment of this invention is next described as follows. FIG. 30 is a block diagram showing the basic arrangement of a film image reproducing apparatus according to the sixth embodiment. FIG. 31 is an exploded oblique view of the film image reproducing apparatus according to the sixth embodiment.

FIGS. 19 to 21 are partial sectional views of the sixth embodiment showing a part including a film cartridge K. FIG. 19 illustrates a state in which a holder tray is protruding from the apparatus body to permit loading or taking-out of the film cartridge in the axial direction thereof. FIG. 20 illustrates a state obtained immediately after the holder tray has been pulled into the apparatus body. FIG. 21 illustrates a state in which the film cartridge is in a film transport operable position.

Figure 32:
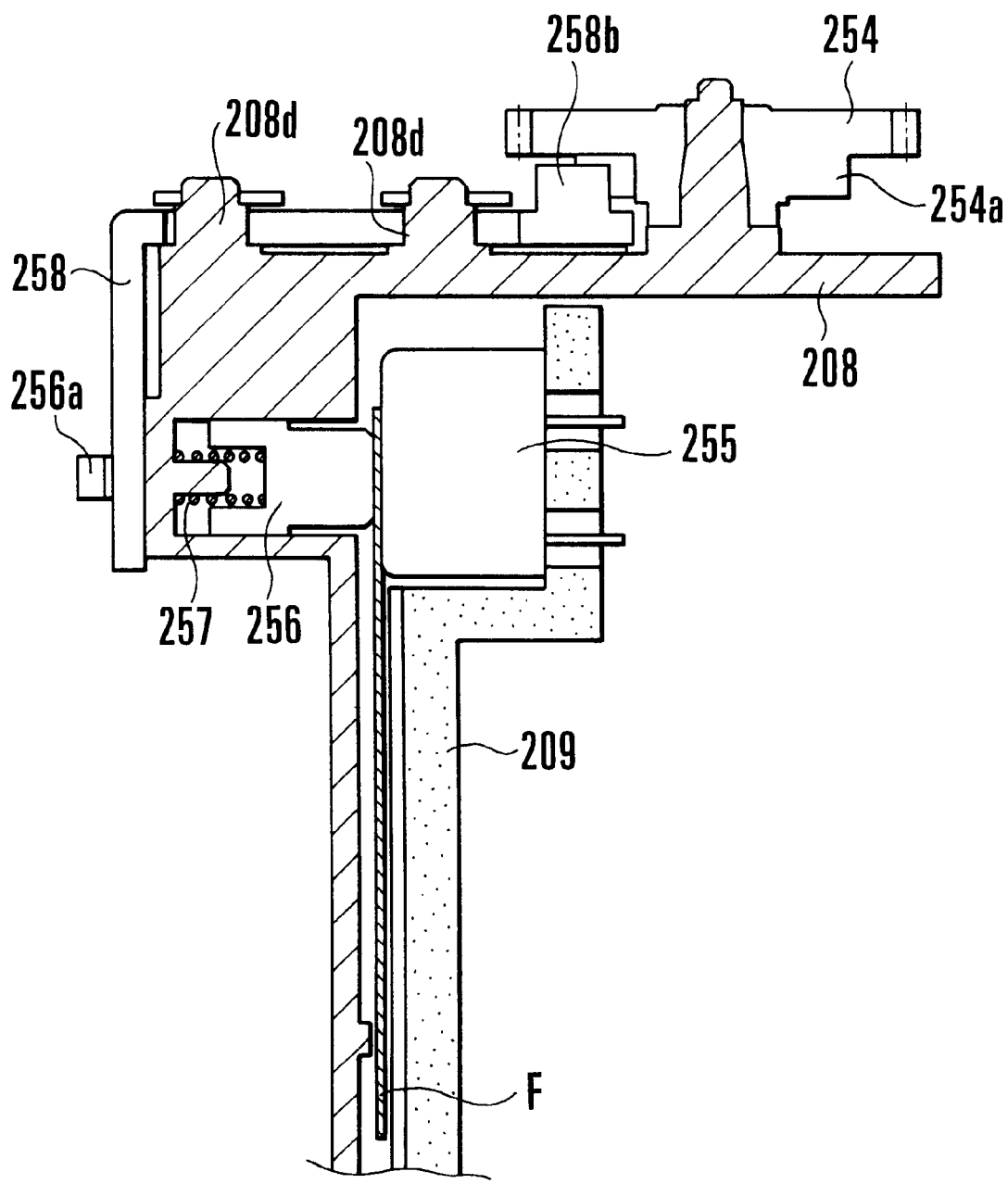
FIG. 32 is a section view showing in part the film image reproducing apparatus of FIG. 30.
Figure 35:
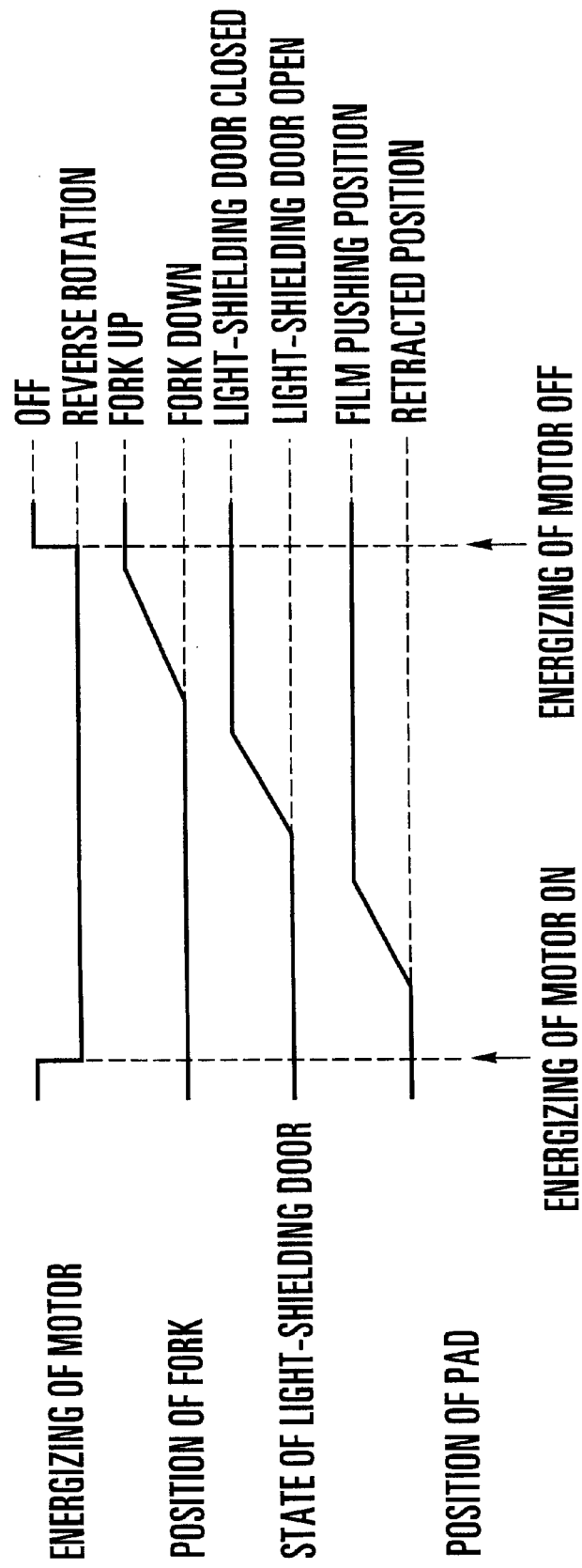
FIG. 35 is a timing chart further showing actions of various parts of the sixth embodiment in relation to an action of the motor.

FIG. 32 is a partial sectional view showing a part of the film image reproducing apparatus including a pad and a magnetic head. FIGS. 22 and 23 show the cartridge holder in relation to a holder switch. FIGS. 33, 34 and 35 are timing charts showing the actions of various parts in relation to a motor.

In the case of the sixth embodiment, the film image reproducing apparatus is connected via a cable to a TV monitor and is arranged to cause an image recorded on a developed film to be reproduced on the screen of the TV monitor.

The basic arrangement of the film image reproducing apparatus is first described below with reference to FIG. 30. All parts that are the same as those shown in FIG. 17 are indicated by the same reference numerals and the details of them are omitted from the following description, which covers only the parts where the sixth embodiment differs from the arrangement of FIG. 17.

A first magnetic head 314 is disposed in a position opposed to a magnetic storage part FJ of a film F contained in a film cartridge. The first magnetic head 314 is thus arranged to read photographic information recorded in the magnetic storage part FJ for each frame while the film is being transported. A second magnetic head 315 is disposed in a position opposed also to the magnetic storage part FJ of the film F and is arranged to record new information in the magnetic storage part FJ while the film is being transported.

An information reading part 326 is arranged to read through the first magnetic head 314 the information recorded in the magnetic storage part FJ, during a film winding action. An information writing part 327 is arranged to write through the second magnetic head 315 information set by an information input part 328 into the magnetic storage part FJ, during the film winding action. Therefore, while images are being reproduced one after another after winding up the film, information on these images can be varied or newly added by erasing existing information or writing new information from or into the magnetic storage part FJ of the film F while looking at the images being reproduced from the film F.

The arrangement of the film image reproducing apparatus according to the sixth embodiment of this invention is next described with reference to FIG. 31 as follows.

A cartridge holder 230 is provided with a cartridge chamber 230a which is arranged to be capable of stowing four film cartridges. A gear 230b is integrally formed on the periphery of the cartridge holder 230. The gear 230b is connected to a first motor M1 through a gear train which is not shown. A holder tray 231 has a shaft 231a formed integrally therewith. The cartridge holder 230 is held by the holder tray 231 in such a way as to be rotatable on the shaft 231a. Two guide shafts 231b are provided on the bottom surface of the holder tray 231. The guide shafts 231b are slidably fitted in guide grooves formed in a base plate (not shown) in such a way as to make the holder tray 231 movable between a position in which the holder tray 231 protrudes from the apparatus body 208 and a position in which the holder tray 231 is stowed within the apparatus body 208.

A holder switch 232 is composed of two switches for two channels formed by a first contact piece 232a and a second contact piece 232b. The rotating position of the cartridge holder 230 is detected when one of four projections 230c provided on the cylindrical surface of the cartridge holder 230 pushes the first contact piece 232a to turn on. With the rotating position thus detected, the cartridge holder 230 is caused to stop rotating in a position where the film can be transported from one film cartridge K. One projection 230d is provided on the cylindrical surface of the cartridge holder 230. The projection 230d is disposed at a height different from the four projections 230c in the direction of the rotation axis. The rotating position of the cartridge holder 230 is detected when the projection 230d pushes the second contact piece 232b to turn on. With the second contact piece 232b turned on, when the holder tray 231 is protruding from the apparatus body 208, the rotating position of the cartridge holder 230 always can be specified by the second contact piece 232b.

An ALL opening-and-closing shaft 233, i.e., the ALL opening-and-closing shaft 206 of FIG. 30, is provided for every one of the four cartridge chambers 230a and is rotatably fitted in a hole 230e formed in the bottom of the cartridge chamber 230a. Each of the ALL opening-and-closing shafts 233 has a key formed at its fore end engaging shaft 233a. These parts are respectively arranged to be capable of engaging the rotation shafts of the light-shielding doors of the film cartridges K.

Further, each of the ALL opening-and-closing shafts 233 is integrally provided with arm parts 233b and 233c which extend in the radial direction. An arm part 234a of an ALL driving lever 234 is disposed between the arm parts 233b and 233c. The ALL driving lever 234 is arranged to swing in such a way as to exert a rotating force on the ALL opening-and-closing shaft 233 by pushing with the arm part 234a. The driving force of the ALL driving lever 234 is derived from a motor M2 via a gear train. A toggle spring 235 is hooked on an arm part 233d of each of the ALL opening-and-closing shafts 233 and is arranged such that forces are exerted at both ends in the rotating direction of the ALL opening-and-closing shaft 233. Therefore, the arrangement gives a sufficient force to have the light-shielding door 203 completely opened or closed when the ALL opening-and-closing shaft 233 is engaging the film cartridge K.

A compression spring 236 is arranged to push a cam abutting part 233e of each of the ALL opening-and-closing shafts 233 against cam faces 231a, 231d, 231e and 231f which are provided on the holder tray 231. A retaining plate 237 which is fixed with a screw to the cartridge holder 230 is arranged to prevent each of the ALL opening-and-closing shafts 233 from pulling away. A fork 205 has a key 205a formed integrally therewith. A fork gear 238 is arranged to hold the fork 205 in such a way as to permit the fork 205 to axially (vertically) move to a slight extent without rotating relative to the fork gear 238. A compression spring 239 is internally disposed to urge the fork gear 238 and the fork 205 to move away from each other in the axial direction of the fork 205. This arrangement enables the fork 205 to engage and axially support the film supply spool 202 without being affected by ununiformity or inconstancy of the length of the film supply spool 202 of the film cartridge K. The fork gear 238 is connected to a third motor M3 through a gear train 238a.

The fork 205 is supported by a fork receiving plate 240, a fork lifting-and-lowering cam gear 241 and an upper cam ring 242 in combination. When the fork lifting-and-lowering cam gear 241 and the upper cam ring 242 are combined into one body with each other, lower cam faces 241a formed at three parts on the inner side of the fork lifting-and-lowering cam gear 241 and upper cam faces 242a formed at three parts of the upper cam ring 242 jointly form cam grooves in pairs. Each of the cam grooves is formed by the confronting pair of the cam faces 241a and 242a. The fork lifting-and-lowering cam gear 241 is rotatably fitted in a hole 208c which is provided in the upper surface of the apparatus body 208.

A fork gear 238 is rotatably fitted in a hole 240a of the fork receiving plate 240. Pins 240b which extend in the direction of the diameter of the fork receiving plate 240 at three parts are fitted into the above-stated cam grooves to act as cam followers. Cutout parts 240c axially formed at three parts in the periphery of the fork receiving plate 240 are guide parts. Rectilinear motion keys 243a axially formed on the inner side of an upper plate 243 and at three parts of the upper plate 243 are slidably fitted in the cutout parts 240c. In other words, the fork receiving plate 240 which is rectilinearly guided vertically moves up and down together with the fork gear 238 which has the fork 205 internally disposed therein, according to the rotation of the fork lifting-and-lowering cam gear 241 which forms the cam grooves.

The fork lifting-and-lowering cam gear 241 has a gear part 241b formed along its outer circumference. The gear part 241b is connected to a gear train which will be described later and is thus arranged to be rotated by a second motor M2. A claw detecting contact piece 244 is arranged to detect the presence or absence of a claw 204 of the film cartridge K. A cartridge detecting contact piece 245 is arranged to detect the presence or absence of the film cartridge K. There is also provided a ground (GND) contact piece 246. The claw detecting contact piece 244 detects whether or not the claw 204 of the film cartridge K is bent. If any film cartridge containing a film which has not yet been developed is loaded, the fore end of the claw detecting contact piece 244 abuts on the unbent claw 204 and then comes into contact with the ground contact piece 246 together with the cartridge detecting contact piece 245. The film of the cartridge is thus judged to be not developed. In a case where a film cartridge with the claw 204 bent is loaded, the fore end of the claw detecting piece 244 does not come into contact with the ground contact piece 246 as it comes into an opening formed by the bent claw 204, so that the film cartridge can be judged to contain a developed film. The fore end of the cartridge detecting contact piece 245 is located where the outside of the film cartridge comes and is arranged to come into contact with the ground contact piece 246 in the presence of the film cartridge and does not come into contact with the contact piece 246 in the absence of the film cartridge, so that the presence or absence of the film cartridge can be detected.

The claw detecting contact piece 244, the cartridge detecting contact piece 245 and the ground contact piece 246 are fixed together with a screw to the fork receiving plate 240 with insulating plates inserted in between them. Reference numeral 247 denotes an external cover. A lid 248 covers an opening part which is provided for allowing the holder tray 231 to egress and ingress. The lid 248 is thus opened or closed according to the egress and ingress of the holder tray 231.

A stepped gear 249 is connected to the second motor M2. Another stepped gear 250 is in mesh with the stepped gear 249 and is arranged to rotate together with the ALL driving lever 234 through an interlocking shaft 251. An idle gear 252 is in mesh with the stepped gear 250 and is also in mesh with the gear part 241b of the fork lifting-and-lowering cam gear 241. Another idle gear 253 is in mesh with the stepped gear 250. A cam gear 254 is in mesh with the idle gear 253 and is integrally provided with a cam part 254a.

Referring to FIG. 32, a magnetic head 255 is fixed to the pressing plate 209. A pad 256 is fitted in a recessed part of the apparatus body 208 through a compression spring 257 and is thus arranged to be movable in the direction of orthogonally intersecting the surface of the film F and to have a force of pushing an area of the film F within which the magnetic storage part FJ is located against the magnetic head 255 after the film F is sent out. A claw part 256a of the pad 256 engages a hole 258a provided in a pad moving plate 258. The pad moving plate 258 has a pin 258b formed integrally therewith and is arranged to be driven with the pin 258b moved in a state of abutting on the cam part 254a of the cam gear 254. A guide slot 258c is formed in the pad moving plate 258 and is slidably fitted on two shafts 208d which are formed on the apparatus body 208. The pad moving plate 258 is arranged to move in a direction orthogonally intersecting the surface of the film and to be retractable against the force of the compression spring 257 away from an area where the film F passes.

In the arrangement described above, the fork 205 is arranged to be moved up and down, the ALL opening-and-closing shafts 233 to be rotated and the pad 256 to be moved all by the second motor M2.

The engaging actions of the ALL opening-and-closing shafts 233 and the ascending and descending actions of the fork 205 in the film image reproducing apparatus according to the sixth embodiment are next described as follow.

In loading the film image reproducing apparatus with the film cartridge K, the operator drops the film cartridge K into the cartridge chamber 230a in the axial direction of the film cartridge K (in the direction of a white arrow) while the holder tray 231 is in the state of protruding from the apparatus body with the lid opened. The position of the cartridge holder 230 in the rotating direction at this time is the same as in the case of FIG. 22.

In other words, when an operation is performed to cause the holder tray 231 to protrude from the apparatus body 208, the driving action of the first motor M1 causes the cartridge holder 230 to rotate. Then, the cartridge holder 230 comes to a stop where the projection 230d which is provided in one place on the cartridge holder 230 pushes the second contact piece 232b to turn on. Following that, the protruding action of the holder tray 231 is performed. When the holder tray 231 is protruding from the apparatus body 208, therefore, the position of the cartridge holder 230 in the rotating direction thereof is always specified. With the apparatus loaded with the four film cartridges, in displaying or reading images from the film cartridges, one after another, the arrangement thus enables the operator to easily know from which of the film cartridges the film can be transported.

When the holder tray 231 is protruding, all the four ALL opening-and-closing shafts 233 have been pulled down from the bottom of the cartridge chamber 230a by the force of the springs 236, so that each film cartridge K can be smoothly dropped down into the cartridge chamber 230a without hindrance. In other words, when the cartridge holder 230 is in a position which is the same as what is shown in FIG. 22, the cam abutting parts 233e of all the ALL opening-and-closing shafts 233 are abutting on the lower cam face 231a of the holder tray 231 among the cam faces of the holder tray 231.

After completion of loading the film cartridges K, a holder tray moving mechanism (not shown) is driven by operating an operation panel (not shown). The holder tray 231 is moved toward the apparatus body 208 to be stowed inside of the apparatus body 208. Subsequently, the cartridge holder 230 rotates. The projection 230c then comes to push the first contact piece 232a of the holder switch 232 to turn on, in the same manner as in the case of FIG. 23. By this, the rotation of the cartridge holder 230 is brought to a stop. In this state, the film cartridge A is in the film transport operable position for displaying (reading) an image recorded on the film contained in the film cartridge A. Other film cartridges B, C and D are stopped in the film transport non-operable position.

More specifically, the ALL opening-and-closing shaft 233 which is disposed at the cartridge chamber 230a in which the film cartridge A is loaded has the cam abutting part 233e climbing the slanting face 231d from the cam face 231a of the holder tray 231 to come to abut on a higher face 231e. Then, the engaging shaft 233a of the ALL opening-and-closing shaft 233 comes to engage the rotation shaft engaging part of the light-shielding door of the film cartridge A.

Under this condition, when an operation is performed to rotate the cartridge holder 230 for replacing the film cartridge currently used for a display (reading) with another film cartridge, the film cartridge B comes to the film transport operable position in the same manner as in the case of FIG. 23. According to the rotation of the cartridge holder 230, the cam abutting part 233e of the ALL opening-and-closing shaft 233 which has been engaging the film cartridge A then descends the slanting face 231f from the cam face 231e of the holder tray 231 to come to abut on the lower face 231a. As a result, the engaging shaft 233a disengages from the film cartridge A. At the same time, another ALL opening-and-closing shaft 233 comes to engage the film cartridge B in the same manner as in the case of the film cartridge A.

Following this, the second motor M2 is driven further to cause the fork lifting-and-lowering cam gear 241 to rotate. Then, the pin 240b moves down along the cam groove formed jointly by the cam face 241a of the fork lifting-and-lowering cam gear 241 and the cam face 242a of the upper cam ring 242. The descent of the pin 240b causes the fork receiving plate 240 to descend together with the fork gear 238 in which the fork 205 is disposed. The fork 205 then comes to engage the engaging hole 202a of the film supply spool 202 of the film cartridge K. Further, when the key 205a of the fork 205 engages the key way 202b of the film supply spool 202, the film cartridge becomes ready for sending the film out.

Further, the claw detecting contact piece 244, the cartridge detecting contact piece 245 and the ground (GND) contact piece 246 which are fixed to the fork receiving plate 240 descend along with the fork receiving plate 240 so as to detect the presence or absence of the film cartridge K and the bent state of the claw of the film cartridge K. If the absence of the film cartridge K is detected, the fork 205 is immediately moved upward and the cartridge holder 230 is caused to rotate to set another cartridge chamber in the film transport operable position. If it is detected that a film cartridge containing an undeveloped film therein has been loaded, the operator can be informed of this result of detection by displaying it on the TV monitor before the film is sent out from the film cartridge in question.

The film sending and rewinding actions are carried out by driving the third motor M3. Since the fork gear 238 moves upward or downward along with the fork receiving plate 240, a gear which is in mesh with the fork gear 238 among the gear train 238a is formed long enough not to disengage the fork gear 238 irrespective of the position of the fork gear 238 in the vertical direction.

The opening and closing actions on the light-shielding door 203 of the film cartridge K and a moving action on the pad 256 to be performed in the film image reproducing apparatus according to the sixth embodiment are next described as follows.

As mentioned above, when the engaging shaft 233a of the ALL opening-and-closing shaft 233 is driven by the second motor M2 in a state of engaging the engaging part 203b of the rotation shaft of the light-shielding door 203 of the film cartridge K, the fork receiving plate 240 first moves downward together with the fork gear 238 in which the fork 205 is disposed. The fork 205 then comes to engage the engaging hole of the film supply spool of the film cartridge K.

Referring to the timing chart of FIG. 33, the ALL driving lever 234 and the cam gear 254 continue to rotate even while the fork 205 is in process of engaging the engaging hole of the film supply spool after the motor M2 begins to rotate. At that time, however, the arm part 234a of the ALL driving lever 234 has not yet reached a position where it engages the arm part 223b of the ALL rotation shaft (ALL opening-and-closing shaft) 233. Further, the cam part 254a of the cam gear 254 has not yet come to abut on the pin 258b of the pad moving plate 258. Therefore, the pad moving plate 258 has not yet been moved.

When the second motor M2 further continues to rotate in the same direction, the arm part 234a of the ALL driving lever 234 comes to engage the arm part 233b of the ALL rotation shaft (ALL opening-and-closing shaft) 233. This causes the ALL rotation shaft 233 to rotate in such a way as to open the light-shielding door 203 of the film cartridge K against the urging force of the toggle spring 235. The toggle spring 235 then reverses the direction of its urging force in such a way as to ensure the open state of the light-shielding door 203. The arm part 234a of the ALL driving lever 234 disengages from the arm part 233b of the ALL rotation shaft 233 when the ALL driving lever 234 further swings.

With the second motor M2 further rotating in the same direction, the cam part 254a of the cam gear 254 abuts on the pin 258b of the pad moving plate 258 to move the pad moving plate 258. In other words, the pad 256 moves away from the magnetic head 255 according to the movement of the pad moving plate 258. A switch (not shown) detects completion of movement of the pad 256 when the pad 256 is retracted from the passing area of the film F. Then, this switch acts to deenergize the second motor M2.

Under this condition, the film F can be sent out from the film cartridge K. Then, the third motor M3 is positively energized to cause the fork 205 to rotate. The film is sent out accordingly as the fork 205 rotates. Upon completion of sending out a predetermined amount of the film F, the second motor M2 is energized reversely to the last energizing direction. With the second motor M2 reversely energized, the pin 257b moves along the cam part 254a of the cam gear 254 to cause the pad 256 to push the area of the film F where the magnetic storage part FJ of the film F is located against the magnetic head 255.

Then, as shown in the timing chart of FIG. 34, a switch (not shown) which is arranged to detect completion of the movement of the pad 256 in the pushing direction acts to turn off the supply of electric power to the second motor M2. At this time, the light-shielding door 203 of the film cartridge K is of course open and the fork 205 is still in its engaged state. After that, the image obtained in each frame of the film is displayed (read) and information is read out or written from or into the magnetic storage part FJ, every time one frame amount of the film F is wound up one after another by rotating the spool.

Upon completion of an image displaying (reading) operation on one film cartridge K, the third motor M3 is reversely energized to reversely rotate the fork 205. The film F is thus rewound. In rewinding the film F, the pad 256 is preferably retracted from the film passing area. Therefore, prior to rewinding of the film, the pad 256 is brought back to its retracted position by energizing the second motor M2 in the positive direction.

After the completion of rewinding of the film, as shown in the timing chart of FIG. 35, the pad 256 is moved near to the magnetic head 255 by energizing the second motor M2 in the reverse direction. The arm part 234a of the ALL driving lever 234 then comes to engage the arm part 233c of the ALL rotation (opening-and-closing) shaft 233 to cause the shaft 233 to reversely rotate against the urging force of the toggle spring 235 in such a way as to close the light-shielding door 203 of the film cartridge K. The toggle spring 235 reverses the direction of its urging force to ensure the closed state of the light-shielding door 203. The further swing of the ALL driving lever 234 then disengages the arm part 234a from the arm part 233c of the ALL rotation shaft 233.

When the second motor M2 is allowed to rotate further in the same direction, a cam lift part of the cam groove formed by the cam face 241a of the fork lifting-and-lowering cam gear 241 and the cam face 242a of the upper cam ring 242 comes to the pin 240b of the fork receiving plate 240. As a result, the fork receiving plate 240 moves upward together with the fork gear 238 in which the fork 205 is disposed. The fork 205 disengages from the engaging hole of the film supply spool of the film cartridge K. Then, a switch (not shown) which is arranged to detect the completion of the upward motion of the fork receiving plate 240 acts to turn off the supply of electric power to the second motor M2. The cartridge holder 230 thus becomes rotatable for changing the film cartridge used for displaying (reading) over to another cartridge.

Figure 36:
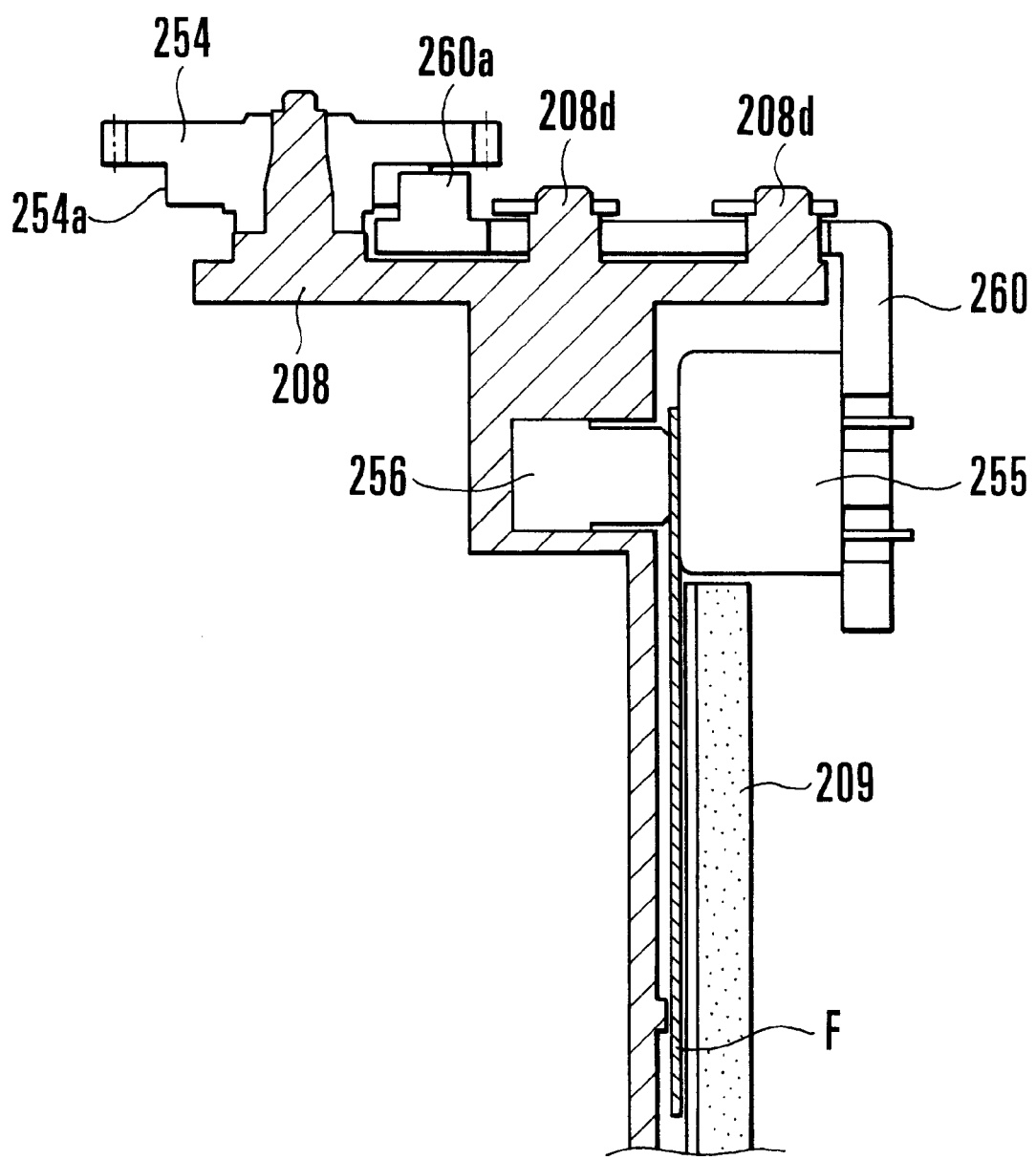
FIG. 36 is a section view showing in part a film image reproducing apparatus arranged according to this invention as a seventh embodiment thereof.

FIG. 36 is a partial sectional view showing a seventh embodiment of this invention. While the sixth embodiment has the pad moving plate arranged to engage the pad and to move in the direction of orthogonally intersecting the film surface, the seventh embodiment has a pad 256 fixed to the apparatus body 208 while a magnetic head 255 is held by a head moving plate 260 and arranged to move in the direction of orthogonally intersecting the film surface according to the movement of the head moving plate 260. Except this difference in arrangement, the seventh embodiment operates in the same manner as the sixth embodiment. The head moving plate 260 is driven by the second motor M2. A cam gear 254 which is connected to the second motor M2 rotates to cause a pin 260a of the head moving plate 260 to abut on the cam part 254a of the cam gear 254 and to cause the head moving plate 260 to move.

This invention is applied by way of example to a film image reproducing apparatus in the case of the sixth and seventh embodiments. However, the arrangements of these embodiments are applicable also to other apparatuses of the kind using film cartridges such as a camera, a photofinisher apparatus, etc.

The film is provided with the magnetic storage part. However, this invention is not limited to such a storage means. Some optical means or the like may be used.

While the cartridge holder is arranged to be capable of stowing four film cartridges, the cartridge holder may be arranged to load only one film cartridge.

In each of the above-stated embodiments, the engaging member provided for opening and closing the light-shielding member of the film cartridge and for film transport is arranged to be movable. Therefore, in loading the film cartridge into the film cartridge holding portion, the film cartridge can be correctly loaded without being hindered by the engaging member. After loading, the engaging member is moved to a predetermined position where the film can be transported. The arrangement of canceling a pressing action permits the head means to be automatically pushed toward the film and pulled away from the film.

Therefore, in accordance with this invention, an image reproducing apparatus, a photofinisher apparatus, a camera or the like can be arranged to be capable of loading a film cartridge and transporting a film, only requiring the operator to simply drop the film cartridge, for example, into the film cartridge holding portion. Besides, the apparatus according to this invention permits writing and reading information into and from the film.

According to the arrangement of each of the embodiments described above, a means for moving the film transport member which is arranged to engage the film transport spool for transporting the film and a means for canceling a pressing action, for example, can be driven with a common drive source. The arrangement, therefore, permits reduction in size and cost of an apparatus such as a film image reproducing apparatus, a photofinisher apparatus, a camera or the like.

What is claimed is:

1. A film cartridge holding device comprising:

a holding member having a holding portion arranged to hold a film cartridge in such a way as to enable the film cartridge to be loaded in an axial direction of the film cartridge; and a moving mechanism arranged to move said holding member between a first position in which said holding portion of said holding member protrudes from said film cartridge holding device in such a way as to enable the film cartridge to be loaded into said holding portion in the axial direction and a second position in which said holding portion of said holding member is stowed in said film cartridge holding device in such a way as to enable a film contained in the film cartridge loaded in said holding portion to be advanced, said holding member has a plurality of holding portions for holding the film cartridge therein, said holding member is rotatable supported and moves any selected one of a plurality of film cartridges held in the plurality of holding portions to a predetermined position to enable advancing of the film from the cartridge by rotation of the holding member while the holding member is kept in the second position.

2. A device according to claim 1, further comprising a discriminating mechanism for discriminating whether said film cartridge is held or not in said holding member.

3. A device according to claim 1, wherein the movement from said first position to said second position of said holding member is made in an almost linear movement.

4. A device according to claim 1, further comprising a detection mechanism for detecting a position of said holding member.

5. A film cartridge holding device comprising:

a holding member having a holding portion arranged to hold a film cartridge in such a way as to enable the film cartridge to be loaded in an axial direction of the film cartridge; and a moving mechanism arranged to move said holding member between a first position in which said holding portion of said holding member protrudes from said film cartridge holding device in such a way as to enable the film cartridge to be loaded into said holding portion in the axial direction and a second position in which said holding portion of said holding member is stowed in said film cartridge holding device in such a way as to enable a film contained in the film cartridge loaded in said holding portion to be advanced, said holding member has a plurality of holding portions for holding the film cartridge therein, said holding member moves any selected one of a plurality of film cartridges held in the plurality of holding portions to a predetermined position to enable advancing of the film from the cartridge while the holding member is kept in the second position, an output of a motor used as a drive source for said moving mechanism is used also as a drive source for a mechanism for moving said plurality of said holding portions of said holding member in said second position.

6. A device according to claim 5, further comprising a discriminating mechanism for discriminating whether said film cartridge is held or not in said holding member.

7. A device according to claim 5, further comprising a detection mechanism for detecting a position of said holding member.

8. An apparatus having a film cartridge holding device, comprising:

a holding member having a holding portion arranged to hold a film cartridge in such a way as to enable the film cartridge to be loaded in an axial direction of the film cartridge; and a moving mechanism arranged to move said holding member between a first position in which said holding portion of said holding member protrudes from said film cartridge holding device in such a way as to enable the film cartridge to be loaded into said holding portion in the axial direction and a second position in which said holding portion of said holding member is stowed in said film cartridge holding device in such a way as to enable a film contained in the film cartridge loaded in said holding portion to be advanced, said holding member has a plurality of holding portions for holding the firm cartridge therein, said holding member is rotatably supported and moves any selected one of a plurality of film cartridges held in the plurality of holding portions to a predetermined position to enable advancing of the film from the cartridge by rotation of the holding member while the holding member is kept in the second position.

9. An apparatus according to claim 8, further comprising a display device for displaying an image recorded on the film.

10. An apparatus according to claim 9, wherein said display device includes a photoelectric conversion element for reading the image recorded on the film and converting the read image into a video signal.

11. An apparatus according to claim 8, further comprising a discriminating mechanism for discriminating whether said film cartridge is held or not in said holding member.

12. An apparatus according to claim 8, further comprising a detection mechanism for detecting a position of said holding member.

13. A film cartridge holding device comprising:

a holding member having a holding portion arranged to hold a film cartridge in such a way as to enable the film cartridge to be loaded in an axial direction of the film cartridge;

a moving mechanism arranged to move said holding member between a first position in which the film cartridge is enabled to be loaded into said holding portion of said holding member in the axial direction and a second position in which a film contained in the film cartridge loaded in said holding portion is enabled to be advanced; and a film advance mechanism having a first driving member arranged to drive a first rotation shaft member for advancing the film contained in the film cartridge, said first driving member being arranged not to come into contact with said first rotation shaft member when said holding member is in said first position, and being arranged to move in an axial direction thereof and come into contact with said first rotation shaft member so as to enable the film to be advanced when said holding member is in said second position, said first driving member, when at the second position, moves from a first state where it does not contact said first rotation shaft member to a second state where it contacts said first rotation shaft member when it is power-driven in said axial direction.

14. A device according to claim 13, wherein said holding member has a plurality of holding portions for holding the film cartridge therein, and said plurality of holding portions are movable with said holding member kept in said second position so as to change a film cartridge in which the film is advanced to another film cartridge.

15. A device according to claim 13, further comprising a discriminating mechanism for discriminating whether said film cartridge is held or not in said holding member.

16. A device according to claim 13, wherein the movement from said first position to said second position of said holding member is made in an almost linear movement.

17. A device according to claim 13, further comprising a detection mechanism for detecting a position of said holding member.

18. A film cartridge holding device comprising:
- a holding member having a holding portion arranged to hold a film cartridge in such a way as to enable the film cartridge to be loaded in an axial direction of the film cartridge;
- a moving mechanism arranged to move said holding member between a first position in which the film cartridge is enabled to be loaded into said holding portion of said holding member in the axial direction and a second position in which a film contained in the film cartridge loaded in said holding portion is enabled to be advanced; and
- a film advance mechanism having a first driving member arranged to drive a first rotation shaft member for advancing the film contained in the film cartridge, said first driving member being arranged not to come into contact with said first rotation shaft member when said holding member is in said first position, and being arranged to move in an axial direction thereof and come into contact with said first rotation shaft member so as to enable the film to be advanced when said holding member is in said second position,
- said holding member has a plurality of holding portions for holding the film cartridge therein, and said plurality of holding portions are movable with said holding member kept in said second position so as to change a film cartridge in which the film is advanced to another film cartridge, an output of a motor used as a drive source for said moving mechanism is used also as a drive source for a mechanism for moving said plurality of said holding portions of said holding member in said second position.

19. A device according to claim 18, wherein said first driving member is housed in said holding member.

20. A film cartridge holding device comprising:
- a holding member having a holding portion arranged to hold a film cartridge in such a way as to enable the film cartridge to be loaded in an axial direction of the film cartridge;
- a moving mechanism arranged to move said holding member between a first position in which the film cartridge is enabled to be loaded into said holding portion of said holding member in the axial direction and a second position in which a film contained in the film cartridge loaded in said holding portion is enabled to be advanced;
- a film advance mechanism having a first driving member arranged to drive a first rotation shaft member for advancing the film contained in the film cartridge, said first driving member being arranged not to come into contact with said first rotation shaft member when said holding member is in said first position, and being arranged to move in an axial direction thereof and come into contact with said first rotation shaft member so as to enable the film to be advanced when said holding member is in said second position; and
- a light-shielding change-over mechanism having a second driving member arranged to drive a second rotation shaft member for opening and closing a film egress/ingress slot of the film cartridge, said second driving member being arranged not to come into contact with said second rotation shaft member when said holding member is in said first position, and being arranged to move in an axial direction thereof and come into contact with said second rotation shaft member so as to enable the opening and closing of the film egress/ingress slot of the film cartridge to be changed over when said holding member is in said second position.

21. A device according to claim 20, wherein said holding member has a plurality of holding portions and said plurality of holding portions are movable with said holding member kept in said second position so as to change a film cartridge in which the film is advanced to another film cartridge.

22. A device according to claim 21, wherein an output of a motor used as a drive source for said moving mechanism is used also as a drive source for a mechanism for moving said plurality of said holding portions of said holding member in said second position.

23. A device according to claim 20, wherein said second driving member is housed in said holding member.

24. An apparatus having a film cartridge holding device, comprising:
- a holding member having a holding portion arranged to hold a film cartridge in such a way as to enable the film cartridge to be loaded in an axial direction of the film cartridge;
- a moving mechanism arranged to move said holding member between a first position in which the film cartridge is enabled to be loaded into said holding portion of said holding member in the axial direction and a second position in which a film contained in the film cartridge loaded in said holding portion is enabled to be advanced; and
- a film advance mechanism having a first driving member arranged to drive a first rotation shaft member for advancing the film contained in the film cartridge, said first driving member being arranged not to come into contact with said first rotation shaft member when said holding member is in said first position, and being arranged to move in an axial direction thereof and come into contact with said first rotation shaft member so as to enable the film to be advanced when said holding member is in said second position, said first driving member, when at the second position, moves from a first state where it does not contact said first rotation shaft member to a second state where it contacts said first rotation shaft member when it is power-driven in said axial direction.

25. An apparatus having a film cartridge holding device, comprising:
- a holding member having a holding portion arranged to hold a film cartridge in such a way as to enable the film cartridge to be loaded in an axial direction of the film cartridge;
- a moving mechanism arranged to move said holding member between a first position in which the film cartridge is enabled to be loaded into said holding portion of said holding member in the axial direction and a second position in which a film contained in the film cartridge loaded in said holding portion is enabled to be advanced;
- a film advance mechanism having a first driving member arranged to drive a first rotation shaft member for advancing the film contained in the film cartridge, said first driving member being arranged not to come into contact with said first rotation shaft member when said holding member is in said first position, and being arranged to move in an axial direction thereof and come into contact with said first rotation shaft member so as to enable the film to be advanced when said holding member is in said second position; and a light-shielding change-over mechanism having a second driving member arranged to drive a second rotation shaft member for opening and closing a film egress/ingress slot of the film cartridge, said second driving member being arranged not to come into contact with said second rotation shaft member when said holding member is in said first position, and being arranged to move in an axial direction thereof and come into contact with said second rotation shift member so as to enable the opening and closing of the film egress/ingress slot of the film cartridge to be changed over when said holding member is in said second position.

26. An apparatus according to claim 24, further comprising a display device for displaying an image recorded on the film.

27. An apparatus according to claim 26, wherein said display device includes a photoelectric conversion element for reading the image recorded on the film and converting the read image into a video signal.

28. An apparatus according to claim 25, further comprising a display device for displaying an image recorded on the film.

29. An apparatus according to claim 28, wherein said display device includes a photoelectric conversion element for reading the image recorded on the film and converting the read image into a video signal.

30. An apparatus according to claim 24, further comprising:

a head member arranged to write or read information into or from an information recording part of the film; and a head moving mechanism arranged to move said head member between a position in which said head member is in contact with the film and a position in which said head member is away from the film.

31. An apparatus according to claim 24, further comprising a pad member arranged to move between a first position in which said pad member is in contact with the film and a second position in which said pad member is away from the film, the film being pinched between said head member and said pad member when said pad is in said first position.

* * * * *

UNITED STATES PATENT AND TRADEMARK OFFICE
CERTIFICATE OF CORRECTION

PATENT NO. : 6,044,233
DATED : March 28, 2000
INVENTOR(S) : Hiroshi Kikuchi

It is certified that error appears in the above-identified patent and that said Letters Patent is hereby corrected as shown below:

Title page,
Column 1, Item [30],
Delete "Sep. 8, 1995 [JP] Japan 7-231098" (second occurrence)
After "Sep. 11, 1995 [JP] Japan 7-232344" insert -- Sep. 11, 1995 {JP} Japan 7-232345 --.

Column 2,
Line 28, after "loading" insert --of --.

Column 3,
Line 2, delete "Q" and insert -- ( --.

Column 4,
Lines 37-38, delete "of having" and insert -- in which --.

Column 7,
Line 14, delete "rotate" and insert -- rotates --.
Line 28, after "apply" insert -- a --.

Column 8,
Line 5, after "apply" insert -- a --.

Column 9,
Line 49, delete "rotatable" and insert -- rotatably --.

Column 14,
Line 23, delete "231a" and insert -- 231c --.

Column 16,
Line 44, delete "231a" and insert -- 231c --.

Column 21,
Line 19, delete "231a" and insert -- 231c --.

Column 23,
Line 56, delete "231a" and insert -- 231c --.

UNITED STATES PATENT AND TRADEMARK OFFICE
CERTIFICATE OF CORRECTION

PATENT NO. : 6,044,233
DATED : March 28, 2000
INVENTOR(S) : Hiroshi Kikuchi

It is certified that error appears in the above-identified patent and that said Letters Patent is hereby corrected as shown below:

Column 24,
Line 3, delete "231a" and insert -- 231c --.

Column 26,
Line 20, after "Except" insert -- for --.

Column 27,
Line 19, delete "rotatable" and insert -- rotatably --.

Column 31,
Line 16, delete "shift" and insert -- shaft --.

Signed and Sealed this

Twenty-fifth Day of September, 2001

Attest:

*Attesting Officer*

NICHOLAS P. GODICI
*Acting Director of the United States Patent and Trademark Office*